US009439019B2

(12) United States Patent
Chen et al.

(10) Patent No.: US 9,439,019 B2
(45) Date of Patent: Sep. 6, 2016

(54) SOUND SIGNAL PROCESSING METHOD AND APPARATUS

(71) Applicant: Huawei Technologies Co., Ltd., Shenzhen (CN)

(72) Inventors: Jingdong Chen, Xi'an (CN); Haiting Li, Beijing (CN); Deming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/822,476

(22) Filed: Aug. 10, 2015

(65) Prior Publication Data

US 2016/0066117 A1 Mar. 3, 2016

(30) Foreign Application Priority Data

Aug. 29, 2014 (CN) .......................... 2014 1 0439142

(51) Int. Cl.
*H04R 5/00* (2006.01)
*H04S 3/00* (2006.01)
(Continued)

(52) U.S. Cl.
CPC ............... *H04S 3/002* (2013.01); *H04R 3/005* (2013.01); *H04R 5/027* (2013.01); *H04S 3/02* (2013.01); *H04S 7/302* (2013.01); *H04W 88/02* (2013.01); *H04R 1/406* (2013.01); *H04R 2201/401* (2013.01); *H04R 2201/405* (2013.01); *H04R 2203/12* (2013.01); *H04S 2400/11* (2013.01);
(Continued)

(58) Field of Classification Search
CPC ......... H04R 5/027; H04R 3/005; H04S 3/00; H04S 1/00; H04S 1/002
See application file for complete search history.

(56) References Cited

U.S. PATENT DOCUMENTS

2006/0040703 A1 2/2006 Lai et al.
2008/0037796 A1 2/2008 Jot et al.
(Continued)

FOREIGN PATENT DOCUMENTS

CN 202818484 U 3/2013
CN 103634561 A 3/2014
(Continued)

OTHER PUBLICATIONS

Dibiase J., et al., "Robust Localization in Reverberent Rooms," Microphone Arrays—Signal Processing Techniques and Applications, Dec. 31, 2001, pp. 157-180.
(Continued)

*Primary Examiner* — Simon Sing
(74) *Attorney, Agent, or Firm* — Conley Rose, P.C.; Grant Rodolph; Nicholas K. Beaulieu

(57) ABSTRACT

A sound signal processing method and apparatus are provided that relate to the audio signal processing field. The method in the present invention includes acquiring, by a mobile terminal, sound signals from a three-dimensional sound field, where at least three microphones are disposed on the mobile terminal and one microphone is configured to receive a sound signal in at least one direction; acquiring, according to the acquired sound signals, a direction of a sound source relative to the mobile terminal; and obtaining spatial audio signals according to the direction of the sound source relative to the mobile terminal and the acquired sound signals, where the spatial audio signals are used for simulating the three-dimensional sound field. The present invention is applicable to a process of collecting and processing signals in a three-dimensional sound field surrounding a terminal.

9 Claims, 24 Drawing Sheets

(51) Int. Cl.
*H04R 3/00* (2006.01)
*H04S 3/02* (2006.01)
*H04R 5/027* (2006.01)
*H04S 7/00* (2006.01)
*H04W 88/02* (2009.01)
*H04R 1/40* (2006.01)

(52) U.S. Cl.
CPC ........ *H04S 2400/15* (2013.01); *H04S 2420/13* (2013.01)

(56) References Cited

U.S. PATENT DOCUMENTS

| | | | |
|---|---|---|---|
| 2009/0054111 A1* | 2/2009 | Takizawa | H04M 1/0214 455/575.1 |
| 2011/0075857 A1* | 3/2011 | Aoyagi | G01S 3/8036 381/92 |
| 2012/0128160 A1 | 5/2012 | Kim et al. | |
| 2013/0272097 A1 | 10/2013 | Kim et al. | |
| 2013/0317830 A1 | 11/2013 | Visser et al. | |

FOREIGN PATENT DOCUMENTS

WO 2013186593 A1 12/2013
WO 2014090277 A1 6/2014

OTHER PUBLICATIONS

Partial English Translation and Abstract of Chinese Patent Application No. CN103634561A, Aug. 20, 2015, 18 pages.
Partial English Translation and Abstract of Chinese Patent Application No. CN202818484U, Aug. 20, 2015, 4 pages.
Foreign Communication From a Counterpart Application, European Application No. 15166654.2, Extended European Search Report dated Aug. 3, 2015, 8 pages.
Foreign Communication From a Counterpart Application, Korean Application No. 10-2015-0075144, Korean Office Action dated Mar. 21, 2016, 5 pages.
Foreign Communication From a Counterpart Application, Korean Application No. 10-2015-0075144, English Translation of Korean Office Action dated Mar. 21, 2016, 3 pages.

* cited by examiner

SOUND SIGNAL PROCESSING METHOD AND APPARATUS

CROSS-REFERENCE TO RELATED APPLICATION

This application claims priority to Chinese Patent Application No. 201410439142.8, filed with the Chinese Patent Office on Aug. 29, 2014, which is incorporated herein by reference in its entirety.

TECHNICAL FIELD

The present invention relates to the audio signal processing field, and in particular, to a sound signal processing method and apparatus.

BACKGROUND

As the electronic information technology develops, three-dimensional sound field collection and processing are improved continuously. A mobile terminal is a common device in a three-dimensional sound field collection and processing system. In the prior art, a specific means for performing three-dimensional sound field collection and processing by a mobile terminal is described below.

A beamforming technology for two-dimensional sound field collection is applied in the mobile terminal, beams with heart-shaped directivity in a 0 degree direction and a 180 degree direction are generated by using the beamforming technology, and collection of a three-dimensional sound signal is implemented. The technology is applied in the three-dimensional sound field collection; beams in different directions are obtained by using the beamforming technology; and the beams are used for simulating a center sound channel, a left front sound channel, a right front sound channel, a left rear surround sound channel, and a right rear surround sound channel in a sound channel and sound field collection system 5.1.

Currently, for the three-dimensional sound field simulated on the mobile terminal by using the beamforming technology for two-dimensional sound field collection, because the beamforming technology for two-dimensional sound field collection is used and the beams with heart-shaped directivity in a 0 degree direction and a 180 degree direction are generated, a phenomenon in which a difference between left and right directions is more obvious than a difference between front and rear directions in an actual playback effect of the simulated three-dimensional sound field, and as a result, the simulated three-dimensional sound field still has a feature of a two-dimensional sound field, and quality of the simulated three-dimensional sound field is relatively poor.

SUMMARY

Embodiments of the present invention provide a sound signal processing method and apparatus, which can collect and process signals in a three-dimensional sound field surrounding a terminal.

To achieve the foregoing objective, the embodiments of the present invention use the following technical solution.

According to a first aspect, an embodiment of the present invention provides a sound signal processing method, including acquiring, by a mobile terminal, sound signals from a three-dimensional sound field, where at least three microphones are disposed on the mobile terminal and one microphone is configured to receive a sound signal in at least one direction; acquiring, according to the acquired sound signals, a direction of a sound source relative to the mobile terminal; and obtaining spatial audio signals according to the direction of the sound source relative to the mobile terminal and the acquired sound signals, where the spatial audio signals are used for simulating the three-dimensional sound field. With reference to the first aspect, in a first possible implementation manner of the first aspect, the acquiring, according to the acquired sound signals, a direction of a sound source relative to the mobile terminal includes acquiring a time difference of arrival between a sound signal in one direction and a sound signal in another direction that are received by the microphones on the mobile terminal, where the microphones on the mobile terminal are configured to receive sound signals in at least four directions; and obtaining, according to the acquired time difference of arrival and locations of the microphones on the mobile terminal on the mobile terminal, the direction of the sound source relative to the mobile terminal.

With reference to the first possible implementation manner of the first aspect, in a second possible implementation manner of the first aspect, the acquiring a time difference of arrival between a sound signal in one direction and a sound signal in another direction that are received by the microphones on the mobile terminal includes acquiring, according to $$\hat{\tau}_m = \arg\max_p r_{y_1 y_m}(p),$$

a time difference $\hat{\tau}_m$ of arrival between a sound signal received by an $m^{th}$ microphone and a sound signal received by a $1^{st}$ microphone, where p represents a quantity of delay sampling points, $y_1(n)$ represents the sound signal received by the $1^{st}$ microphone, $y_m(n)$ represents the sound signal received by the $m^{th}$ microphone, $r_{y_1 y_m}(p) = \int_{-\infty}^{\infty} \Phi(f) S_{y_1 y_m}(f) e^{-j2\pi f p} df$, $S_{y_1 y_m}(f)$ represents a correlated spectrum between $y_1(n)$ and $y_m(n)$, and $\Phi(f)$ represents a weight function of a frequency domain in which sound signals received in all directions are located.

With reference to the second possible implementation manner of the first aspect, in a third possible implementation manner of the first aspect, the obtaining, according to the acquired time difference of arrival and locations of the microphones on the mobile terminal on the mobile terminal, the direction of the sound source relative to the mobile terminal includes estimating, according to $$\hat{\theta}_2 = \arcsin\left(\frac{\hat{\tau}_2 c}{h}\right),$$

a direction $\hat{\theta}_2$ of a sound signal received by a $2^{nd}$ microphone; estimating, according to $$\hat{\theta}_3 = \arccos\left(\frac{\hat{\tau}_3 c}{\sqrt{d^2 + h^2}}\right) - \alpha,$$

a direction $\hat{\theta}_3$ of a sound signal received by a $3^{rd}$ microphone; and estimating, according to $$\hat{\theta}_4 = \arccos\left(\frac{\hat{\tau}_4 c}{d}\right),$$

a direction $\hat{\theta}_4$ of a sound signal received by a 4$^{th}$ microphone; and acquiring, according to $$\theta = \frac{1}{3}\sum_{m=2}^{4}\hat{\theta}_m,$$

the direction θ of the sound source relative to the mobile terminal, where the 1$^{st}$ microphone and the 4$^{th}$ microphone are located on a same side and the 1$^{st}$ microphone and the 2$^{nd}$ microphone are located on a same side; and c represents a sound speed, d represents a distance between a central point of the 1$^{st}$ microphone and a central point of the 4$^{th}$ microphone, d is equal to a distance between a central point of the 2$^{nd}$ microphone and a central point of the 3$^{rd}$ microphone, h represents a distance between the central point of the 1$^{st}$ microphone and the central point of the 2$^{nd}$ microphone, h is equal to a distance between the central point of the 3$^{rd}$ microphone and the central point of the 4$^{th}$ microphone, and α represents an included angle between a diagonal of the mobile terminal and a side of an angle at which the 1$^{st}$ microphone and the 4$^{th}$ microphone are located.

With reference to the second possible implementation manner of the first aspect, in a fourth possible implementation manner of the first aspect, the obtaining, according to the acquired time difference of arrival and locations of the microphones on the mobile terminal on the mobile terminal, the direction of the sound source relative to the mobile terminal includes:

acquiring, according to $$\begin{cases} \hat{\tau}_2 = \frac{(y_2\cos\theta - x_2\sin\theta) - (y_1\cos\theta - x_1\sin\theta)}{c} \\ \hat{\tau}_3 = \frac{(y_3\cos\theta - x_3\sin\theta) - (y_1\cos\theta - x_1\sin\theta)}{c} \\ \hat{\tau}_4 = \frac{(y_4\cos\theta - x_4\sin\theta) - (y_1\cos\theta - x_1\sin\theta)}{c} \end{cases},$$

the direction θ of the sound source relative to the mobile terminal, where the 1$^{st}$ microphone and the 2$^{nd}$ microphone are located on an axis of symmetry of one surface of the mobile terminal and are separately located on two parallel edges on the one surface; the 3$^{rd}$ microphone and the 4$^{th}$ microphone are located on an axis of symmetry of another surface of the mobile terminal and are separately located on two parallel edges on the another surface; and c represents a sound speed, $(x_1,y_1)$ represents coordinates corresponding to the 1$^{st}$ microphone, $(x_2,y_2)$ represents coordinates corresponding to the 2$^{nd}$ microphone, $(x_3,y_3)$ represents coordinates corresponding to the 3$^{rd}$ microphone, and $(x_4,y_4)$ represents coordinates corresponding to the 4$^{th}$ microphone.

With reference to the sound signal processing method according to any one of the first aspect or the first to fourth possible implementation manners of the first aspect, in a fifth possible implementation manner of the first aspect, the spatial audio signals include at least a signal in a left direction, a signal in a right direction, a signal in a center direction, a left rear surround signal, and a right rear surround signal; and the obtaining spatial audio signals according to the direction of the sound source relative to the mobile terminal and the acquired sound signals includes generating gain adjusting parameters by using the direction of the sound source relative to the mobile terminal, where the gain adjusting parameters include a first-type gain adjusting parameter $\alpha_F$ corresponding to the signal in the left direction, the signal in the right direction, and the signal in the center direction, a first-type gain adjusting parameter $\alpha_B$ corresponding to the left rear surround signal and the right rear surround signal, a second-type gain adjusting parameter $\alpha_L$ corresponding to the signal in the left direction and the left rear surround signal, and a second-type gain adjusting parameter $\alpha_R$ corresponding to the signal in the right direction and the right rear surround signal; and in addition, for the direction of the sound source relative to the mobile terminal, when θ∈[0,90)∪(270,360], $\alpha_F > \alpha_B$, when θ∈(90, 270), $\alpha_F < \alpha_B$, when θ∈(0,180), $\alpha_L > \alpha_R$, and when θ∈(180, 360), $\alpha_L < \alpha_R$; acquiring initial values of the signals in all the directions in the spatial audio signals according to the sound signals; and generating the signal in the left direction, the signal in the right direction, the signal in the center direction, the left rear surround signal, and the right rear surround signal according to the gain adjusting parameters and the initial values of the signals in all the directions in the spatial audio signals.

With reference to the fifth possible implementation manner of the first aspect, in a sixth possible implementation manner of the first aspect, the spatial audio signals further include a two-channel signal; and the method further includes downmixing the signal in the left direction, the signal in the right direction, the signal in the center direction, the left rear surround signal, and the right rear surround signal to generate the two-channel signal.

With reference to the fifth possible implementation manner of the first aspect, in a seventh possible implementation manner of the first aspect, the generating gain adjusting parameters by using the direction of the sound source relative to the mobile terminal includes: generating, according to $$\alpha_F = \begin{cases} \alpha_{F,max1}, \theta = 0 \\ \alpha_{F,max1} + \frac{\alpha_{F,med1} - \alpha_{F,max1}}{90}\theta, \theta \in (0, 90) \\ \alpha_{F,med1}, \theta = 90 \\ \alpha_{F,med1} + \frac{\alpha_{F,min} - \alpha_{F,med1}}{90}(\theta - 90), \theta \in (90, 180) \\ \alpha_{F,min}, \theta = 180 \\ \alpha_{F,min} + \frac{\alpha_{F,med2} - \alpha_{F,min}}{90}(\theta - 180), \theta \in (180, 270) \\ \alpha_{F,med2}, \theta = 270 \\ \alpha_{F,med2} + \frac{\alpha_{F,max2} - \alpha_{F,med2}}{90}(\theta - 270), \theta \in (270, 360) \end{cases},$$

the first-type gain adjusting parameter $\alpha_F$ corresponding to the signal in the left direction, the signal in the right direction, and the signal in the center direction; generating, according to $$\alpha_B = \begin{cases} \alpha_{B,min1}, \theta = 0 \\ \alpha_{B,min1} + \frac{\alpha_{B,med1} - \alpha_{B,min1}}{90}\theta, \theta \in (0, 90) \\ \alpha_{B,med1}, \theta = 90 \\ \alpha_{B,med1} + \frac{\alpha_{B,max} - \alpha_{B,med1}}{90}(\theta - 90), \theta \in (90, 180) \\ \alpha_{B,max}, \theta = 180 \\ \alpha_{B,max} + \frac{\alpha_{B,med2} - \alpha_{B,max}}{90}(\theta - 180), \theta \in (180, 270) \\ \alpha_{B,med2}, \theta = 270 \\ \alpha_{B,med2} + \frac{\alpha_{B,min2} - \alpha_{B,med2}}{90}(\theta - 270), \theta \in (270, 360) \end{cases},$$

the first-type gain adjusting parameter $\alpha_B$ corresponding to the left rear surround signal and the right rear surround signal, where $\alpha_{F, min}$, $\alpha_{F, med1}$, $\alpha_{F, max1}$, $\alpha_{F, med2}$, $\alpha_{F, max2}$, $\alpha_{B, min1}$, $\alpha_{B, med1}$, $\alpha_{B, min2}$, $\alpha_{B, med2}$, and $\alpha_{B, max}$ are constants greater than zero, and $\alpha_{F, min} < \alpha_{F, med1} < \alpha_{F, max1}$, $\alpha_{F, min} < \alpha_{F, med2} < \alpha_{F, max2}$, $\alpha_{B, min1} < \alpha_{B, med1} < \alpha_{B, max}$, $\alpha_{B, min2} < \alpha_{B, med2} < \alpha_{B, max}$, $\alpha_{B, med1} = \alpha_{F, med1}$, and $\alpha_{B, med2} = \alpha_{F, med2}$; generating, according to $$\alpha_L = \begin{cases} \alpha_{L,med1}, & \theta = 0 \\ \alpha_{L,med1} + \frac{\alpha_{L,max} - \alpha_{L,med1}}{90}\theta, & \theta \in (0, 90) \\ \alpha_{L,max}, & \theta = 90 \\ \alpha_{L,max} + \frac{\alpha_{L,med2} - \alpha_{L,max}}{90}(\theta - 90), & \theta \in (90, 180) \\ \alpha_{L,med2}, & \theta = 180 \\ \alpha_{L,med2} + \frac{\alpha_{L,min} - \alpha_{L,med2}}{90}(\theta, 180), & \theta \in (180, 270) \\ \alpha_{L,min}, & \theta = 270 \\ \alpha_{L,min} + \frac{\alpha_{L,med1} - \alpha_{L,min}}{90}(\theta - 270), & \theta \in (270, 360) \end{cases},$$

the second-type gain adjusting parameter $\alpha_L$ corresponding to the signal in the left direction and the left rear surround signal; and generating, according to $$\alpha_R = \begin{cases} \alpha_{R,med1}, & \theta = 0 \\ \alpha_{R,med1} + \frac{\alpha_{R,min} - \alpha_{R,med1}}{90}\theta, & \theta \in (0, 90) \\ \alpha_{R,min}, & \theta = 90 \\ \alpha_{R,min} + \frac{\alpha_{R,med2} - \alpha_{R,min}}{90}(\theta - 90), & \theta \in (90, 180) \\ \alpha_{R,med2}, & \theta = 180 \\ \alpha_{R,med2} + \frac{\alpha_{R,max} - \alpha_{R,med2}}{90}(\theta, 180), & \theta \in (180, 270) \\ \alpha_{R,max}, & \theta = 270 \\ \alpha_{R,max} + \frac{\alpha_{R,med1} - \alpha_{R,max}}{90}(\theta - 270), & \theta \in (270, 360) \end{cases},$$

the second-type gain adjusting parameter $\alpha_R$ corresponding to the signal in the right direction and the right rear surround signal, where $\alpha_{L, med1}$, $\alpha_{L, max}$, $\alpha_{L, med2}$, $\alpha_{L, min}$, $\alpha_{R, med1}$, $\alpha_{R, min}$, $\alpha_{R, med2}$, and $\alpha_{R, max}$ are constants greater than zero, $\alpha_{L, min} < \alpha_{L, med1} < \alpha_{L, max}$, $\alpha_{L, min} < \alpha_{L, med2} < \alpha_{L, max}$, $\alpha_{R, min} < \alpha_{R, med1} < \alpha_{R, max}$, $\alpha_{R, min} < \alpha_{R, med2} < \alpha_{R, max}$, $\alpha_{L, med1} = \alpha_{R, med1}$, and $\alpha_{L, med2} = \alpha_{R, med2}$.

With reference to the seventh possible implementation manner of the first aspect, in an eighth possible implementation manner of the first aspect, the generating the signals in all the directions in the spatial audio signals according to the gain adjusting parameters and the initial values of the signals in all the directions in the spatial audio signals includes acquiring the signal $S_{L, final}(n)$ in the left direction, the signal $S_{C, final}(n)$ in the center direction, the signal $S_{R, final}(n)$ in the right direction, the left rear surround direction signal $S_{LS, final}(n)$, and the right rear surround signal $S_{RS, final}(n)$ according to $$\begin{cases} S_{L,final}(n) = S_L(n) * \alpha_F * \alpha_L \\ S_{C,final}(n) = S_C(n) * \alpha_F \\ S_{R,final}(n) = S_R(n) * \alpha_F * \alpha_R \\ S_{LS,final}(n) = S_{LS}(n) * \alpha_B * \alpha_L \\ S_{RS,final}(n) = S_{RS}(n) * \alpha_B * \alpha_R \end{cases}, \text{ where } S_L(n)$$

represents an initial value of the signal in the left direction, $S_C(n)$ represents an initial value of the signal in the center direction, $S_R(n)$ represents an initial value of the signal in the right direction, $S_{LS}(n)$ represents an initial value of the left rear surround signal, $S_{RS}(n)$ represents an initial value of the right rear surround signal, and n represents a sampling point number.

With reference to the seventh possible implementation manner of the first aspect, in a ninth possible implementation manner of the first aspect, the acquiring initial values of the signals in all the directions in the spatial audio signals according to the sound signals includes acquiring beams $BF_L(n)$ $BF_R(n)$ $BF_{LS}(n)$, and $BF_{RS}(n)$ with heart-shaped directivity, where a maximum directivity of $BF_L(n)$ is within (0,90°), a maximum directivity of $BF_{LS}(n)$ is within (90°, 180°), a maximum directivity of $BF_{RS}(n)$ is within (180°, 270°), and a maximum directivity of $BF_R(n)$ is within (270°,360°), where an initial value of the signal in the left direction $S_L(n)=BF_L(n)$, an initial value of the signal in the center direction $$S_C(n) = \frac{BF_L(n) + BF_R(n)}{2},$$

an initial value of the signal in the right direction $S_R(n)=BF_R(k)$, an initial value of the left rear surround signal $S_{LS}(n)=BF_{LS}(n)$, and an initial value of the right rear surround signal $S_{RS}(n)=BF_{RS}(n)$, where $S_L(n)$ represents the initial value of the signal in the left direction, $S_C(n)$ represents the initial value of the signal in the center direction, $S_R(n)$ represents the initial value of the signal in the right direction, $S_{LS}(n)$ represents the initial value of the left rear surround signal, $S_{RS}(n)$ represents the initial value of the right rear surround signal, and n represents a sampling point number.

With reference to the ninth possible implementation manner of the first aspect, in a tenth possible implementation manner of the first aspect, the acquiring beams $BF_L(n)$, $BF_R(n)$, $BF_{LS}(n)$, and $BF_{RS}(n)$ with heart-shaped directivity includes acquiring a beam $BF_{ij}(n)$ with heart-shaped directivity by using the sound signals received by the $1^{st}$ to the $4^{th}$ microphones, where a maximum point of a maximum directivity of $BF_{ij}(n)$ is in a direction pointing from a connecting line between the $i^{th}$ microphone and a $j^{th}$ microphone to the $i^{th}$ microphone, and a zero point of directivity of $BF_{ij}(n)$ is in a direction pointing from the connecting line between the $i^{th}$ microphone and the $j^{th}$ microphone to the $j^{th}$ microphone, where i and j are equal to 1, 2, 3, or 4; and acquiring the beams $BF_L(n)$, $BF_R(n)$, $BF_{LS}(n)$, and $BF_{RS}(n)$ with heart-shaped directivity according to $$\begin{cases} BF_L(n) = \frac{BF_{21}(n) + BF_{23}(n)}{2} \\ BF_R(n) = \frac{BF_{12}(n) + BF_{14}(n)}{2} \\ BF_{LS}(n) = \frac{BF_{32}(n) + BF_{34}(n)}{2} \\ BF_{RS}(n) = \frac{BF_{41}(n) + BF_{43}(n)}{2} \end{cases}.$$

With reference to the seventh possible implementation manner of the first aspect, in an eleventh possible implementation manner of the first aspect, the generating the signals in all the directions in the spatial audio signals according to the gain adjusting parameters and the initial values of the signals in all the directions in the spatial audio signals includes acquiring the signal $S_{L, final}(n)$ in the left direction according to $S_{L, final}(n)=S_L(n)*\alpha_L$; acquiring the signal $S_{C, final}(n)$ in the center direction according to $S_{C, final}(n)=S_C(n)$ acquiring the signal $S_{R, final}(n)$ in the right direction according to $S_{R, final}(n)=S_R(n)*\alpha_R$; acquiring the left rear surround signal $S_{LS, final}(n)$ according to $S_{LS, final}(n)=S_{LS}(n)*\alpha_L$; and acquiring the right rear surround signal $S_{RS, final}(n)$ according to $S_{RS, final}(n)=S_{RS}(n)*\alpha_R$, where $S_{LS}(n)$ represents an initial value of the signal in the left direction, $S_C(n)$ represents an initial value of the signal in the center direction, $S_R(n)$ represents an initial value of the signal in the right direction, $S_{LS}(n)$ represents an initial value of the left rear surround signal, $S_{RS}(n)$ represents an initial value of the right rear surround signal, and n represents a sampling point number.

According to a second aspect, the present invention provides a sound signal processing apparatus, including a first acquiring module configured to acquire sound signals from a three-dimensional sound field, where at least three microphones are disposed on the mobile terminal and one microphone is configured to receive a sound signal in at least one direction; a second acquiring module configured to acquire, according to the acquired sound signals, a direction of a sound source relative to the mobile terminal; and a first processing module configured to obtain spatial audio signals according to the direction of the sound source relative to the mobile terminal and the acquired sound signals, where the spatial audio signals are used for simulating the three-dimensional sound field.

With reference to the second aspect, in a first possible implementation manner of the second aspect, the second acquiring module includes a first acquiring unit configured to acquire a time difference of arrival between a sound signal in one direction and a sound signal in another direction that are received by the microphones on the mobile terminal, where the microphones on the mobile terminal are configured to receive sound signals in at least four directions; and a second acquiring unit configured to obtain, according to the acquired time difference of arrival and locations of the microphones on the mobile terminal on the mobile terminal, the direction of the sound source relative to the mobile terminal.

With reference to the first possible implementation manner of the second aspect, in a second possible implementation manner of the second aspect, the first acquiring unit includes a first acquiring subunit configured to acquire, according to $$\hat{\tau}_m = \underset{p}{\operatorname{argmax}} r_{y_1 y_m}(p),$$

a time difference $\hat{\tau}_m$ of arrival between a sound signal received by an $m^{th}$ microphone and a sound signal received by a $1^{st}$ microphone, where p represents a quantity of delay sampling points, $y_1(n)$ represents the sound signal received by the $1^{st}$ microphone, $y_m(n)$ represents the sound signal received by the $m^{th}$ microphone, $r_{y_1 y_m}(p)=\int_{-\infty}^{\infty}\Phi(f)S_{y_1 y_m}(f)e^{j2\pi fp}df$, $S_{y_1 y_m}(f)$ represents a correlated spectrum between $y_1(n)$ and $y_m(n)$, and $\Phi(f)$ represents a weight function of a frequency domain in which sound signals received in all directions are located.

With reference to the second possible implementation manner of the second aspect, in a third possible implementation manner of the second aspect, the second acquiring unit includes a second acquiring subunit configured to estimate, according to $$\hat{\theta}_2 \arcsin\left(\frac{\hat{\tau}_2 c}{h}\right),$$

a direction $\hat{\theta}_2$ of a sound signal received by a $2^{nd}$ microphone; estimate, according to $$\hat{\theta}_3 = \arccos\left(\frac{\hat{\tau}_3 c}{\sqrt{d^2+h^2}}\right) - \alpha,$$

a direction $\hat{\theta}_3$ of a sound signal received by a $3^{rd}$ microphone; and estimate, according to $$\hat{\theta}_4 = \arccos\left(\frac{\hat{\tau}_4 c}{d}\right),$$

a direction $\hat{\theta}_4$ of a sound signal received by a $4^{th}$ microphone; and a third acquiring subunit configured to acquire, according to $$\theta = \frac{1}{3}\sum_{m=2}^{4}\hat{\theta}_m,$$

the direction $\theta$ of the sound source relative to the mobile terminal, where the $1^{st}$ microphone and the $4^{th}$ microphone are located on a same side and the $1^{st}$ microphone and the $2^{nd}$ microphone are located on a same side; and c represents a sound speed, d represents a distance between a central point of the $1^{st}$ microphone and a central point of the $4^{th}$ microphone, d is equal to a distance between a central point of the $2^{nd}$ microphone and a central point of the $3^{rd}$ microphone, h represents a distance between the central point of the $1^{st}$ microphone and the central point of the $2^{nd}$ microphone, h is equal to a distance between the central point of the $3^{rd}$ microphone and the central point of the $4^{th}$ microphone, and $\alpha$ represents an included angle between a diagonal of the mobile terminal and a side of an angle at which the $1^{st}$ microphone and the $4^{th}$ microphone are located.

With reference to the second possible implementation manner of the second aspect, in a fourth possible implementation manner of the second aspect, the second acquiring unit includes a fourth acquiring subunit configured to acquire, according to $$\begin{cases}\hat{\tau}_2 = \frac{(y_2\cos\theta - x_2\sin\theta) - (y_1\cos\theta - x_1\sin\theta)}{c} \\ \hat{\tau}_3 = \frac{(y_3\cos\theta - x_3\sin\theta) - (y_1\cos\theta - x_1\sin\theta)}{c} \\ \hat{\tau}_4 = \frac{(y_4\cos\theta - x_4\sin\theta) - (y_1\cos\theta - x_1\sin\theta)}{c}\end{cases},$$

the direction $\theta$ of the sound source relative to the mobile terminal, where the $1^{st}$ microphone and the $2^{nd}$ microphone are located on an axis of symmetry of one surface of the mobile terminal and are separately located on two parallel edges on the one surface; the $3^{rd}$ microphone and the $4^{th}$ microphone are located on an axis of symmetry of another surface of the mobile terminal and are separately located on two parallel edges on the another surface; and c represents a sound speed, $(x_1,y_1)$ represents coordinates corresponding to the 1$^{st}$ microphone, $(x_2,y_2)$ represents coordinates corresponding to the 2$^{nd}$ microphone, $(x_3,y_3)$ represents coordinates corresponding to the 3$^{rd}$ microphone, and $(x_4,y_4)$ represents coordinates corresponding to the 4$^{th}$ microphone.

With reference to the sound signal processing apparatus according to any one of the second aspect or the first to fourth possible implementation manners of the second aspect, the spatial audio signals include at least a signal in a left direction, a signal in a right direction, a signal in a center direction, a left rear surround signal, and a right rear surround signal; and the first processing module includes a first processing unit configured to generate gain adjusting parameters by using the direction of the sound source relative to the mobile terminal, where the gain adjusting parameters include a first-type gain adjusting parameter $\alpha_F$ corresponding to the signal in the left direction, the signal in the right direction, and the signal in the center direction, a first-type gain adjusting parameter $\alpha_B$ corresponding to the left rear surround signal and the right rear surround signal, a second-type gain adjusting parameter $\alpha_L$ corresponding to the signal in the left direction and the left rear surround signal, and a second-type gain adjusting parameter $\alpha_R$ corresponding to the signal in the right direction and the right rear surround signal; and in addition, for the direction of the sound source relative to the mobile terminal, when $\theta \in [0,90) \forall (270,360]$, $\alpha_F > \alpha_B$, when $\theta \in (90,270)$, $\alpha_F < \alpha_B$, when $\theta \in (0,180)$, $\alpha_L > \alpha_R$, and when $\theta \in (180,360)$ $\alpha_L < \alpha_R$; a second processing unit configured to acquire initial values of the signals in all the directions in the spatial audio signals according to the sound signals; and a third processing unit configured to generate the signal in the left direction, the signal in the right direction, the signal in the center direction, the left rear surround signal, and the right rear surround signal according to the gain adjusting parameters and the initial values of the signals in all the directions in the spatial audio signals.

With reference to the fourth possible implementation manner of the second aspect, in a sixth possible implementation manner of the second aspect, the spatial audio signals further include a two-channel signal; and the apparatus further includes a fourth processing unit configured to downmix the signal in the left direction, the signal in the right direction, the signal in the center direction, the left rear surround signal, and the right rear surround signal to generate the two-channel signal.

According to the sound signal processing method and apparatus provided in the embodiments of the present invention, sound signals can be acquired from a three-dimensional sound field surrounding a mobile terminal; directions of all sound sources relative to the mobile terminal are acquired; and then, spatial audio signals used for simulating the three-dimensional sound field are generated by using the directions of the sound sources relative to the mobile terminal and the sound signals. In a solution provided in the present invention, sound signals used for simulating a three-dimensional sound field can be collected and processed by using elements of a mobile terminal; in addition, directions, relative to the mobile terminal, of sound sources received in all directions are obtained by means of analysis; and then, an effect of the three-dimensional sound field is simulated according to the directions, relative to the mobile terminal, of the sound sources in all the directions. In a solution in the prior art, a three-dimensional sound field is simulated by using only beams in two directions, 0 degree and 180 degree. However, in the present invention, directions, relative to the mobile terminal, of the sound sources in all the directions are acquired, and the sound sources are not limited to the two directions, 0 degree and 180 degree; therefore, a phenomenon in which a difference between left and right directions is more obvious than a difference between front and rear directions in the simulated three-dimensional sound field can be relieved, thereby improving quality of the simulated three-dimensional sound field.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely some but not all the embodiments of the present invention. All other embodiments obtained by a person of ordinary skill in the art based on the embodiments of the present invention without creative efforts shall fall within the protection scope of the present invention.

Figure 1:
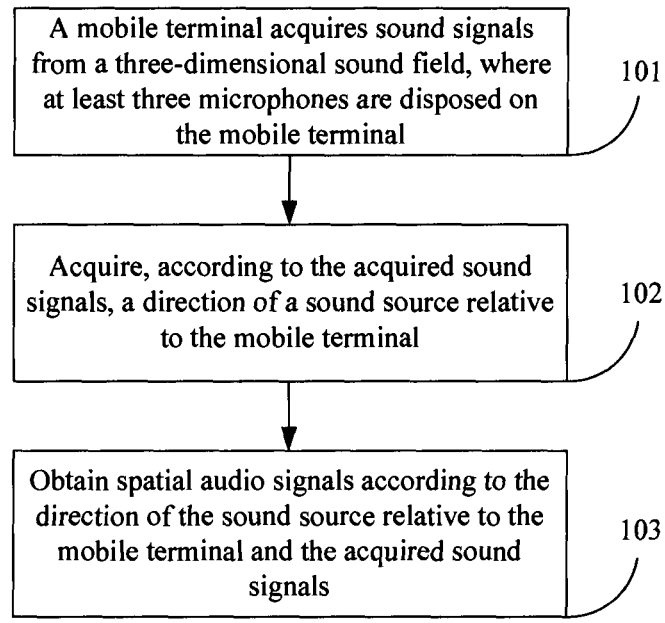
FIG. 1 is a flowchart of a sound signal processing method according to an embodiment of the present invention.

An embodiment of the present invention provides a sound signal processing method, and as shown in FIG. 1, the method includes the following steps.

Step 101: A mobile terminal acquires sound signals from a three-dimensional sound field, where at least three microphones are disposed on the mobile terminal.

One microphone is configured to receive a sound signal in at least one direction.

This embodiment of the present invention may be applied in a mobile terminal, where microphones are arranged on the mobile terminal and the microphones are configured to measure the three-dimensional sound field, acquire sound signals from the three-dimensional sound field, transmit the sound signals to a processor in the mobile terminal for enhancement processing, and in addition, may transmit sound signals before and after the enhancement to a storage in the mobile terminal for storing. The microphones arranged on the mobile terminal may be omni-directional microphones or may be microphones with certain directivity. For example, Micro-Electro-Mechanical System (MEMS) microphones or Electret Condenser Microphones (ECM) may be arranged on the mobile terminal.

Figure 1A:
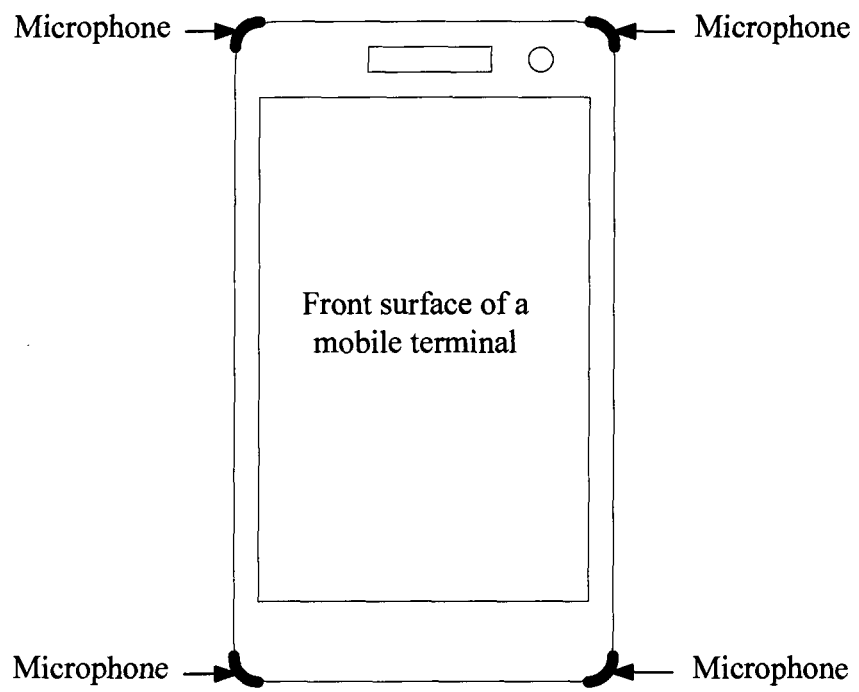
FIG. 1A, FIG. 1B, FIG. 1C, FIG. 1D, and FIG. 1E are schematic structural diagrams of an application scenario of sound signal processing according to an embodiment of the present invention.
Figure 1B:
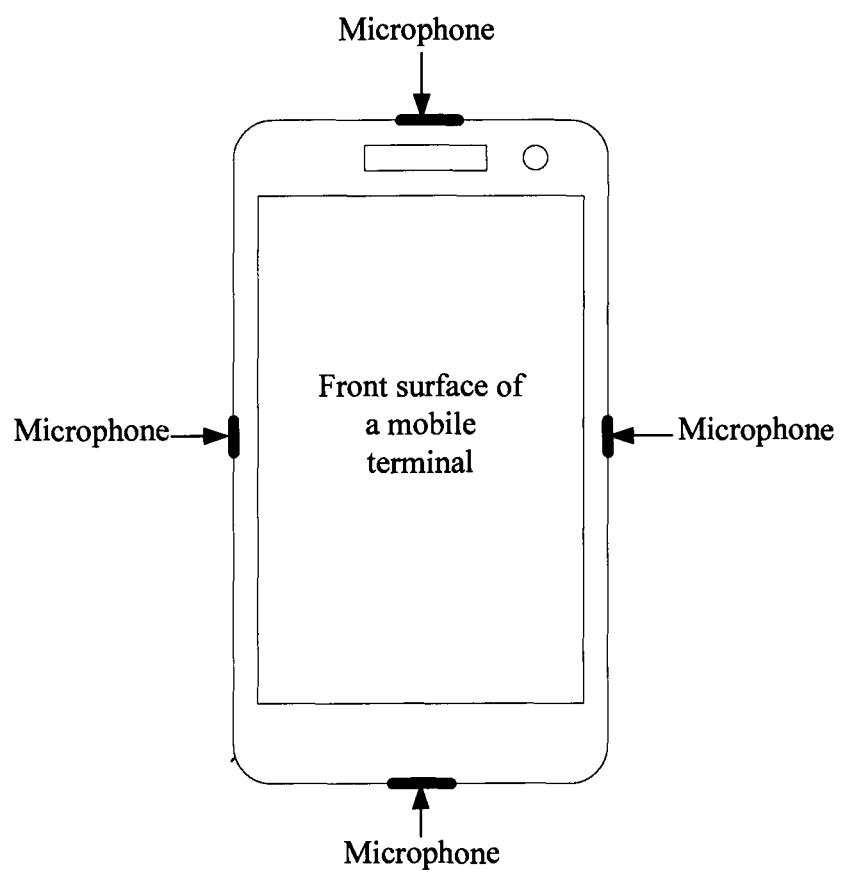
Figure 1C:
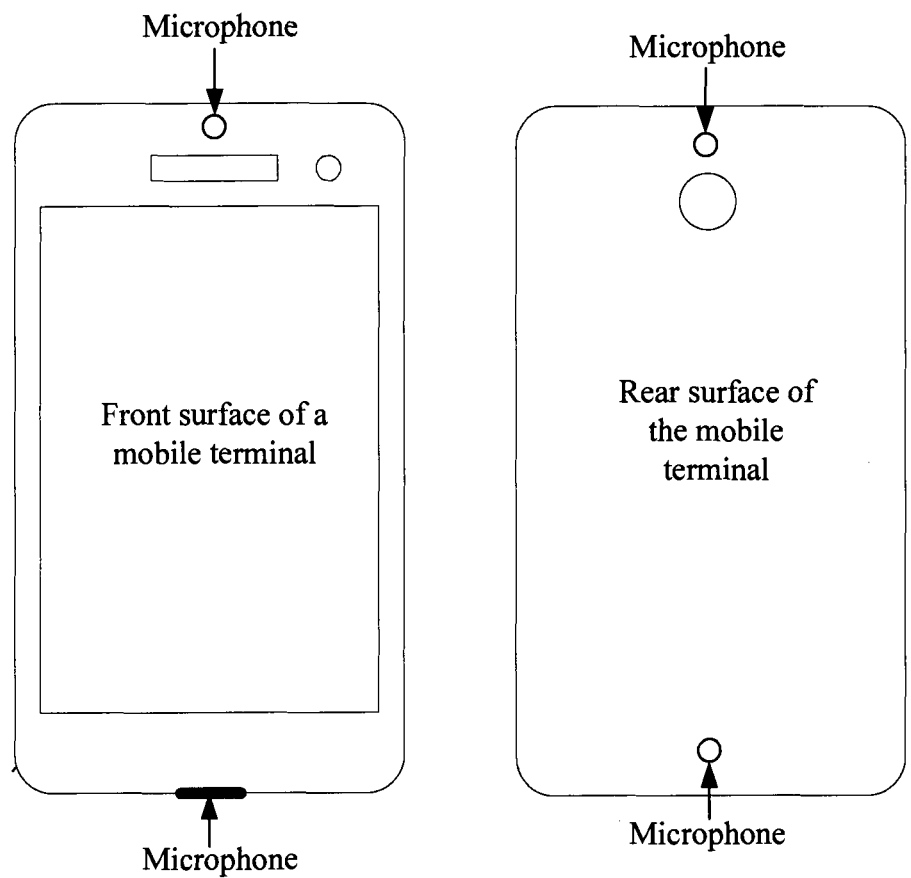
Figure 1D:
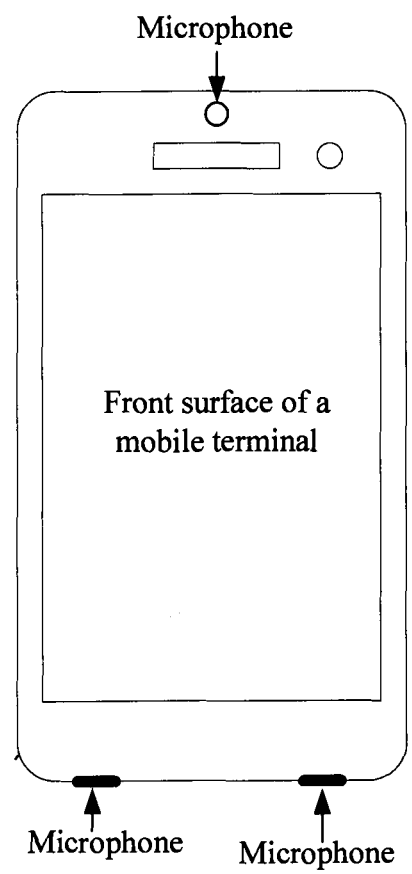
Figure 1E:
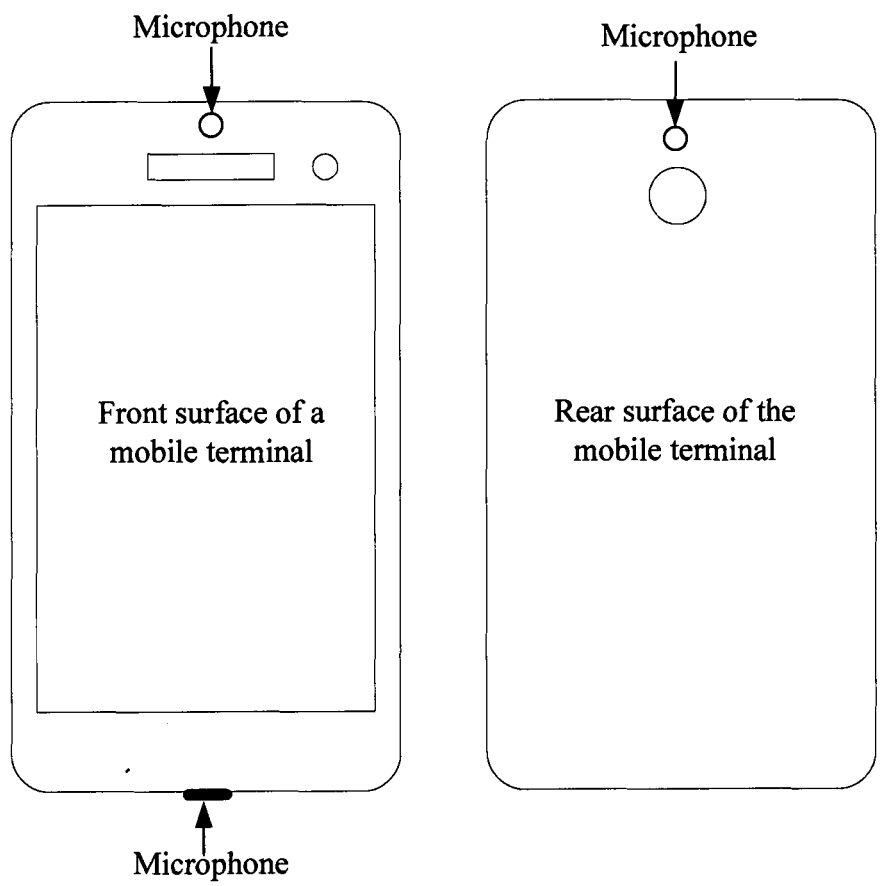

In this embodiment, there may be multiple manners for arranging the microphones on the mobile terminal. In different arranging manners, a quantity and locations of microphones on the mobile terminal are not limited. In this embodiment, cases of four microphones and three microphones are used as examples for description. For example, on the mobile terminal, as shown in FIG. 1A, the four microphones may be separately disposed on four angles of the mobile terminal. Optionally, as shown in FIG. 1B, the four microphones may also be separately disposed on four sides of the mobile terminal. Optionally, as shown in FIG. 1C, one microphone may also be disposed on a bottom side of the mobile terminal, near a front earpiece, near a rear camera, and near a rear bottom side each. For another example, simply three microphones may be disposed on the mobile terminal. As shown in FIG. 1D, two microphones are disposed on a bottom side of the mobile terminal and one microphone is disposed near a front earpiece. Optionally, as shown in FIG. 1E, one microphone may be disposed on a bottom side of the mobile terminal, near a front earpiece, and near a rear camera each.

Step 102: Acquire, according to the acquired sound signals, a direction of a sound source relative to the mobile terminal.

The mobile terminal estimates the emitted sound source by using the microphones and obtains the direction of the sound source relative to the mobile terminal. In this embodiment, there may be multiple methods for estimating the sound source, for example, based on a maximum-output-power-based controllable beamforming technology, or a time-difference-of-arrival-based positioning technology, or a high-resolution-spectrum-estimation-based positioning technology.

In addition, when estimating a location of the sound source, the mobile terminal may further perform enhancement processing on the received sound signals. For example, the mobile terminal may obtain enhanced sound signals in all the directions by using a technical means such as beamforming, spatial prediction, or auditory scenario analysis. For example, a specific method used by the mobile terminal to enhance the sound signals by means of the beamforming may include a fixed beamforming technology such as delay-and-sum beamforming or filtering-and-sum beamforming, or an adaptive beamforming technology such as an adaptive beamforming algorithm based on the minimum variance distortionless response principle, linear constraint minimum variance beamforming, or a sidelobe cancellation algorithm, or a difference beamforming technology. A specific method used by the mobile terminal to enhance the sound signals by means of the spatial prediction may include presetting spatial sound signals expected to be collected in some directions, and then converting, by using a pre-trained optimal filter group and a spatial prediction technology, sound signals in all directions received by a sound receiver on the mobile terminal into the preset signals that are expected to be outputted in some directions, so that noises of the outputted enhanced sound signals are the least and a prediction error approaches zero. In this embodiment, the auditory scenario analysis technology may be a blind source separation algorithm.

Sound signals at least with beam directivity in two directions are obtained by means of enhancement. A sound signal with beam directivity in one direction obtained by means of enhancement processing on a sound signal received by one microphone, for example, may be differentiated as sound signals in all directions sent from sound sources in different directions such as front, rear, left, and right to the mobile terminal. For example, after the mobile terminal performs enhancement processing on the received sound signals, enhanced sound signals in four directions are generated, separately having left front, right front, left rear, and right rear beam directivity; or enhanced sound signals in four directions are generated, separately having front, rear, left, and right beam directivity. In this embodiment, sound signals with different directivity in multiple directions may also be merged into sound signals in one specified direction according to specific needs, and a beam shape of the sound signals with beam directivity that are obtained by means of the enhancement processing may be heart-shaped directivity, or may be super-heart-shaped or in another shape.

Step 103: Obtain spatial audio signals according to the direction of the sound source relative to the mobile terminal and the acquired sound signals.

The spatial audio signals are used for simulating the three-dimensional sound field. The three-dimensional sound field may be understood as a sound field in a certain range surrounding the mobile terminal. The sound source may send a sound signal from any direction in the three-dimensional sound field and the sound signal is received by the mobile terminal.

For example, the mobile terminal generates, by using the direction of the sound source relative to the mobile terminal and the sound signals received in all the directions, spatial audio signals used for a simulated sound field of a 5.1 sound channel playback system. The mobile terminal may map enhanced sound signals in all the directions to sound signals in six directions in total that are required for the spatial audio signals used for forming the simulated sound field of the 5.1 sound channel playback system, and further improve, by using the direction of the sound source relative to the mobile terminal, a degree of separation of the sound signals in the six directions that are required for the spatial audio signals used for the simulated sound field of the 5.1 sound channel playback system. For example, the mobile terminal may calculate, according to the direction of the sound source relative to the mobile terminal, a gain adjusting parameter, for each direction, of the sound signals required for the spatial audio signals used for the simulated sound field of the 5.1 sound channel playback system; and adjust, by using the gain adjusting parameter, the sound signals required for the spatial audio signals used for the simulated sound field of the 5.1 sound channel playback system. The spatial audio signals include at least a signal in a left direction, a signal in a right direction, a signal in a center direction, a left rear surround signal, and a right rear surround signal.

There may be multiple relationships between the sound signals in all the directions received by the mobile terminal and the sound signals in the six directions that are required for the spatial audio signals used for the simulated sound field of the 5.1 sound channel playback system. For example, the sound signals received by the mobile terminal are enhanced and sound signals in four directions are outputted, where the four directions are separately left front, left rear, right front, and right rear; the sound signal in the left front direction is mapped to a sound signal in a left direction required for the spatial audio signals used for the simulated sound field of the 5.1 sound channel playback system; the sound signal in the right front direction is mapped to a sound signal in a right direction required for the spatial audio signals used for the simulated sound field of the 5.1 sound channel playback system; an average signal is taken between the sound signal in the left front direction and the sound signal in the right front direction and the average signal is mapped to a sound signal in a center direction required for the spatial audio signals used for the simulated sound field of the 5.1 sound channel playback system; the sound signal in the left rear direction is mapped to a left rear surround sound signal required for the spatial audio signals used for the simulated sound field of the 5.1 sound channel playback system; the sound signal in the right rear direction is mapped to a right rear surround sound signal required for the spatial audio signals used for the simulated sound field of the 5.1 sound channel playback system; and an average value is taken among the sound signals in the left front direction, in the left rear direction, in the right front direction, and in the right rear direction, and 150 Hertz (Hz) low-pass filtering processing is performed on the average value to obtain a super bass signal required for the spatial audio signals used for the simulated sound field of the 5.1 sound channel playback system.

For another example, the sound signals received by the mobile terminal are enhanced and sound signals in four directions, separately sound signals in the four directions, front, rear, left, and right, are outputted; an average signal of the sound signals in the left direction and the front direction is mapped to a sound signal in a left direction required for the spatial audio signals used for the simulated sound field of the 5.1 sound channel playback system; an average signal of the sound signals in the right direction and the front direction is mapped to a sound signal in a right direction required for the spatial audio signals used for the simulated sound field of the 5.1 sound channel playback system; the sound signal in the front direction is mapped to a sound signal in a center direction required for the spatial audio signals used for the simulated sound field of the 5.1 sound channel playback system; an average signal of the sound signals in the left direction and the rear direction is mapped to a left rear surround sound signal required for the spatial audio signals used for the simulated sound field of the 5.1 sound channel playback system; an average signal of the sound signals in the right direction and the rear direction is mapped to a right rear surround sound signal required for the spatial audio signals used for the simulated sound field of the 5.1 sound channel playback system; and an average value is taken among the sound signals in the front direction, in the rear direction, in the left direction, and in the right direction, and 150 Hz low-pass filtering processing is performed on the average value to obtain a super bass signal required for the spatial audio signals used for the simulated sound field of the 5.1 sound channel playback system.

According to the sound signal processing method provided in this embodiment of the present invention, sound signals can be acquired from a three-dimensional sound field of a mobile terminal; directions of all sound sources relative to the mobile terminal are acquired; and then, spatial audio signals used for simulating the three-dimensional sound field are obtained by using the directions of the sound sources relative to the mobile terminal and the sound signals. In a solution provided in the present invention, sound signals used for simulating a three-dimensional sound field can be collected and processed by using elements of a mobile terminal; in addition, directions, relative to the mobile terminal, of sound sources received in all directions are obtained by means of analysis; and then, an effect of the three-dimensional sound field is enhanced according to the directions, relative to the mobile terminal, of the sound sources in all the directions. In a solution in the prior art, a three-dimensional sound field is simulated by using only beams. However, in the present invention, directions, relative to the mobile terminal, of the sound sources in all the directions are acquired, and further, gain adjustment is performed on beamforming by using information about the directions; therefore, a phenomenon in which a difference between left and right directions is more obvious than a difference between front and rear directions in the simulated three-dimensional sound field can be relieved, thereby improving quality of the simulated three-dimensional sound field.

Figure 2:
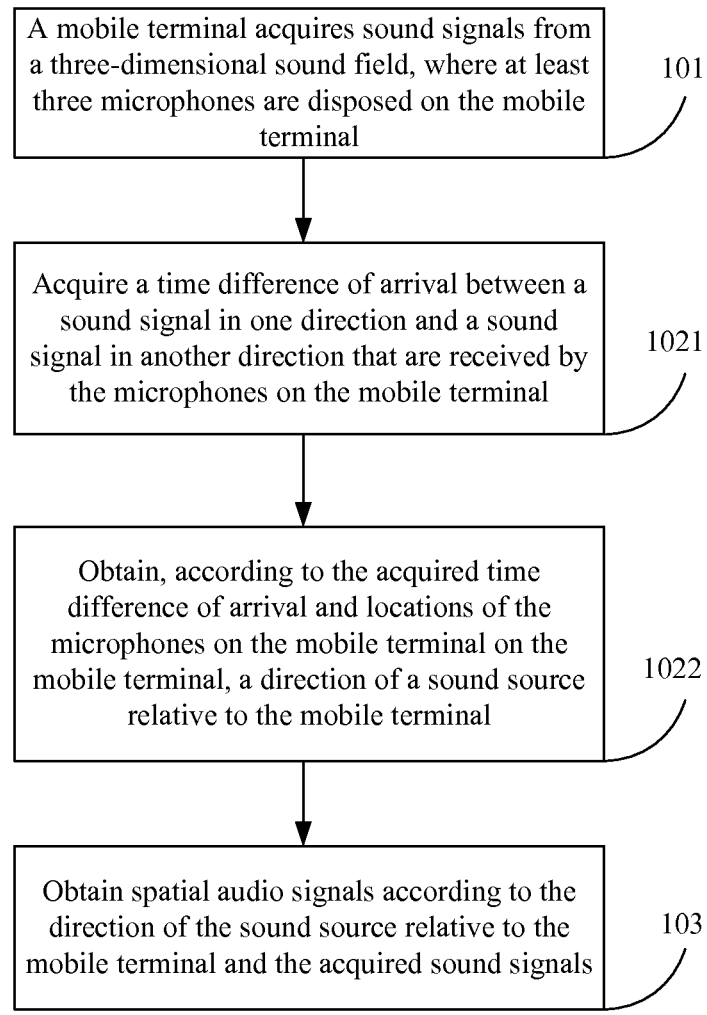
FIG. 2 is a flowchart of another sound signal processing method according to an embodiment of the present invention.

In this embodiment, there may be multiple methods used by the mobile terminal to acquire the direction of the sound source relative to the mobile terminal. For example, spatial coordinates of the mobile terminal and a mobile terminal acting as the sound source may be acquired by using a positioning technology, and the direction of the sound source relative to the mobile terminal may be determined according to the spatial coordinates of the mobile terminal and the mobile terminal acting as the sound source. However, a process of positioning the mobile terminal needs to occupy network bandwidth and the positioning process has certain delay. In this embodiment, the mobile terminal needs to acquire directions of sound sources that are in multiple directions and relative to the mobile terminal, and the directions of the sound sources relative to the mobile terminal may be acquired by using a time-difference-of-arrival-based positioning technology. Therefore, as shown in FIG. 2, a specific implementation manner of step 102 may include the following steps.

Step 1021: Acquire a time difference of arrival between a sound signal in one direction and a sound signal in another direction that are received by the microphones on the mobile terminal.

The microphones on the mobile terminal are configured to receive sound signal in at least four directions.

A time difference $\hat{\tau}_m$ of arrival between a sound signal received by an $m^{th}$ microphone and a sound signal received by a $1^{st}$ microphone is acquired according to $$\hat{\tau}_m = \mathrm{argmax}_p r_{y_1 y_m}(p),$$

where p represents a quantity of delay sampling points. A value of p is generally acquired at random within a specified range according to a condition such as a relative distance and a location relationship between the microphones in different application systems, a signal sampling rate, a sound speed, or a range of an incident angle of the sound source. $y_1(n)$ represents the sound signal received by the 1$^{st}$ microphone, $y_m(n)$ represents the sound signal received by the m$^{th}$ microphone, $r_{y_1 y_m}(p) = \int_{-\infty}^{\infty} \Phi(f) S_{y_1 y_m}(f) e^{j2\pi f p} df$, $S_{y_1 y_m}(f)$ represents a correlated spectrum between $y_1(n)$ and $y_m(n)$, and $\Phi(f)$ represents a weight function of a frequency domain in which sound signals received in all directions are located.

Step 1022: Obtain, according to the acquired time difference of arrival and locations of the microphones on the mobile terminal on the mobile terminal, a direction of a sound source relative to the mobile terminal.

According to a difference between manners for arranging the microphones on the mobile terminal, there may be multiple specific manners used by the mobile terminal to acquire the direction of the sound source relative to the mobile terminal.

For example, on a mobile terminal, the 1$^{st}$ microphone and the 4$^{th}$ microphone are located on a same side and the 1$^{st}$ microphone and the 2$^{nd}$ microphone are located on a same side; c represents a sound speed, d represents a distance between a central point of the 1$^{st}$ microphone and a central point of the 4$^{th}$ microphone, d is equal to a distance between a central point of the 2$^{nd}$ microphone and a central point of the 3$^{rd}$ microphone, h represents a distance between the central point of the 1$^{st}$ microphone and the central point of the 2$^{nd}$ microphone, h is equal to a distance between the central point of the 3$^{rd}$ microphone and the central point of the 4$^{th}$ microphone, and α represents an included angle between a diagonal of the mobile terminal and a side of an angle at which the 1$^{st}$ microphone and the 4$^{th}$ microphone are located.

Figure 2A:
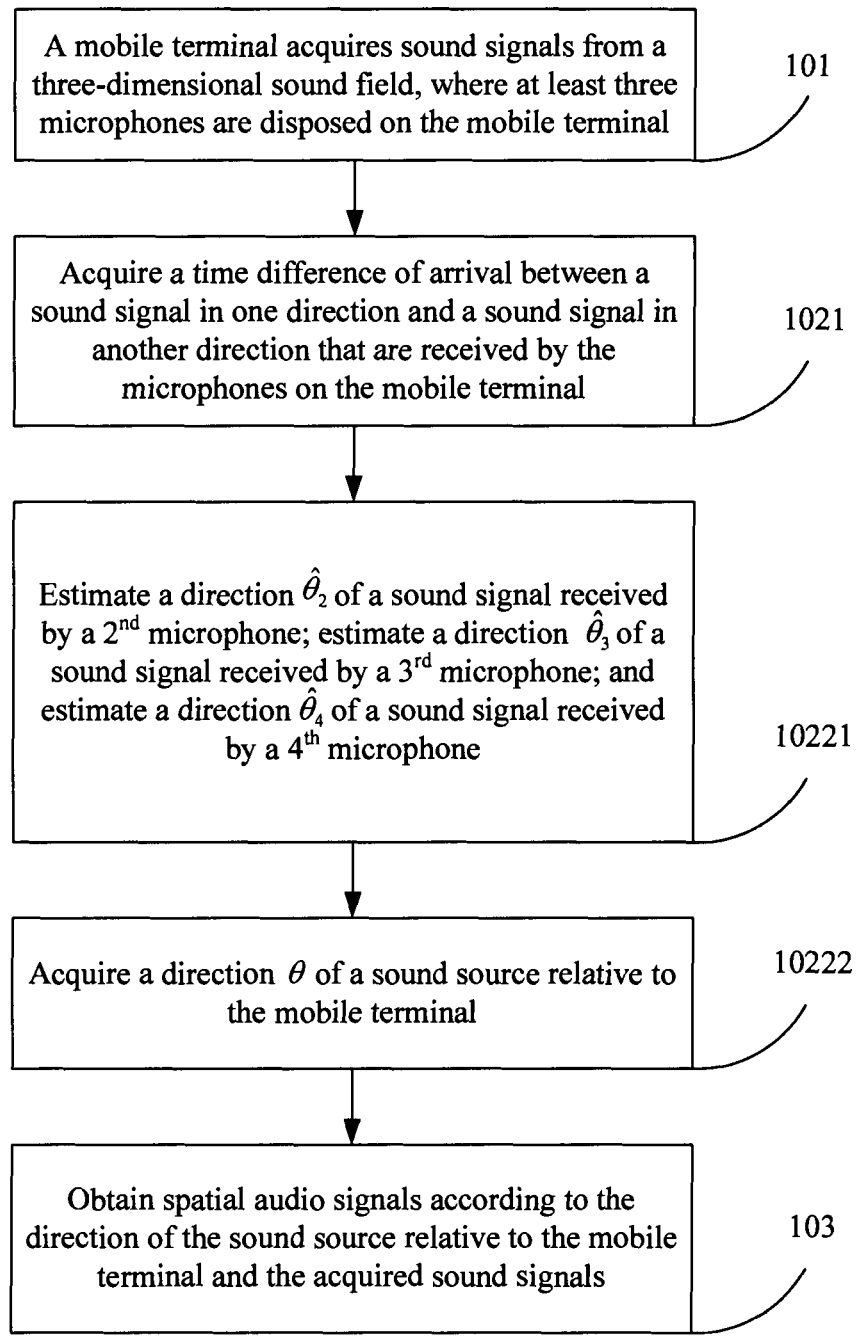
FIG. 2A is a flowchart of a specific implementation manner of a sound signal processing method according to an embodiment of the present invention.

As shown in FIG. 2A, step 1022 may be implemented as steps 10221 to 10222.

Step 10221: Estimate, according to $$\hat{\theta}_2 \arcsin\left(\frac{\hat{\tau}_2 c}{h}\right),$$

a direction $\hat{\theta}_2$ of a sound signal received by a 2$^{nd}$ microphone; estimate, according to $$\hat{\theta}_3 = \arccos\left(\frac{\hat{\tau}_3 c}{\sqrt{d^2 + h^2}}\right) - \alpha,$$

a direction $\hat{\theta}_3$ of a sound signal received by a 3$^{rd}$ microphone; and estimate, according to $$\hat{\theta}_4 = \arccos\left(\frac{\hat{\tau}_4 c}{d}\right),$$

a direction $\hat{\theta}_4$ of a sound signal received by a 4$^{th}$ microphone.

The directions $\hat{\theta}_2$, $\hat{\theta}_3$, and $\hat{\theta}_4$ are estimated values obtained according to $$\hat{\theta}_2 = \arcsin\left(\frac{\hat{\tau}_2 c}{h}\right), \hat{\theta}_3 = \arccos\left(\frac{\hat{\tau}_3 c}{\sqrt{d^2 + h^2}}\right) - \alpha, \text{ and}$$

$$\hat{\theta}_4 = \arccos\left(\frac{\hat{\tau}_4 c}{d}\right).$$

A value obtained by averaging sampled data samples by using $$\theta = \frac{1}{3} \sum_{m=2}^{4} \hat{\theta}_m$$

in step 10222 is an exact value.

Step 10222: Acquire, according to $$\theta = \frac{1}{3} \sum_{m=2}^{4} \hat{\theta}_m,$$

a direction θ of a sound source relative to the mobile terminal.

For another example, on another mobile terminal, the 1$^{st}$ microphone and the 2$^{nd}$ microphone are located on an axis of symmetry of one surface of the mobile terminal and are separately located on two parallel edges on the one surface; the 3$^{rd}$ microphone and the 4$^{th}$ microphone are located on an axis of symmetry of another surface of the mobile terminal and are separately located on two parallel edges on the another surface; and c represents a sound speed, $(x_1, y_1)$ represents coordinates corresponding to the 1$^{st}$ microphone, $(x_2, y_2)$ represents coordinates corresponding to the 2$^{nd}$ microphone, $(x_3, y_3)$ represents coordinates corresponding to the 3$^{rd}$ microphone, and $(x_4, y_4)$ represents coordinates corresponding to the 4$^{th}$ microphone.

Figure 2B:
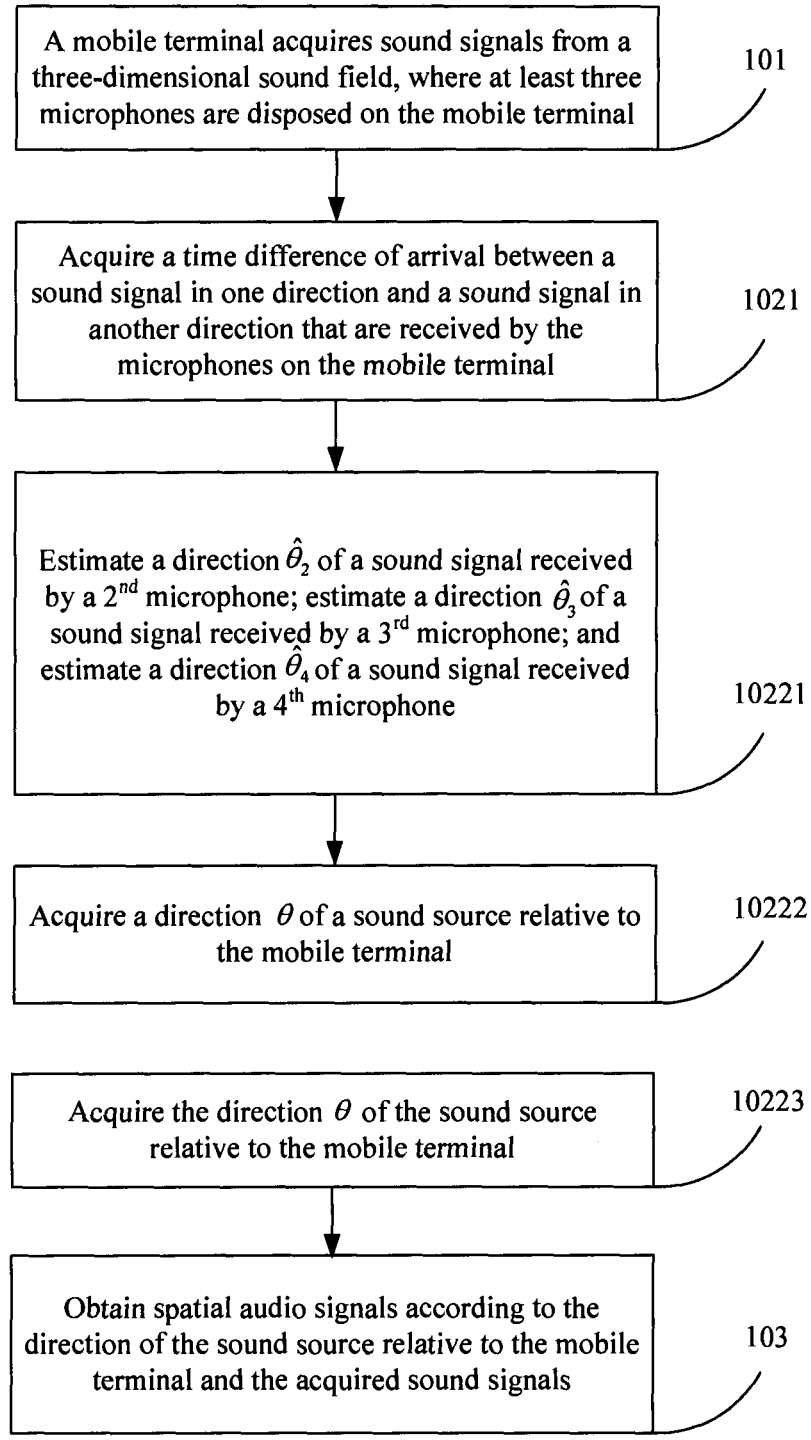
FIG. 2B is a flowchart of a specific implementation manner of another sound signal processing method according to an embodiment of the present invention.

As shown in FIG. 2B, step 1022 may be implemented as step 10223.

Step 10223: Acquire, according to $$\begin{cases} \hat{\tau}_2 = \frac{(y_2 \cos\theta - x_2 \sin\theta) - (y_1 \cos\theta - x_1 \sin\theta)}{c} \\ \hat{\tau}_3 = \frac{(y_3 \cos\theta - x_3 \sin\theta) - (y_1 \cos\theta - x_1 \sin\theta)}{c} \\ \hat{\tau}_4 = \frac{(y_4 \cos\theta - x_4 \sin\theta) - (y_1 \cos\theta - x_1 \sin\theta)}{c} \end{cases},$$

a direction θ of a sound source relative to the mobile terminal.

Figure 2C:
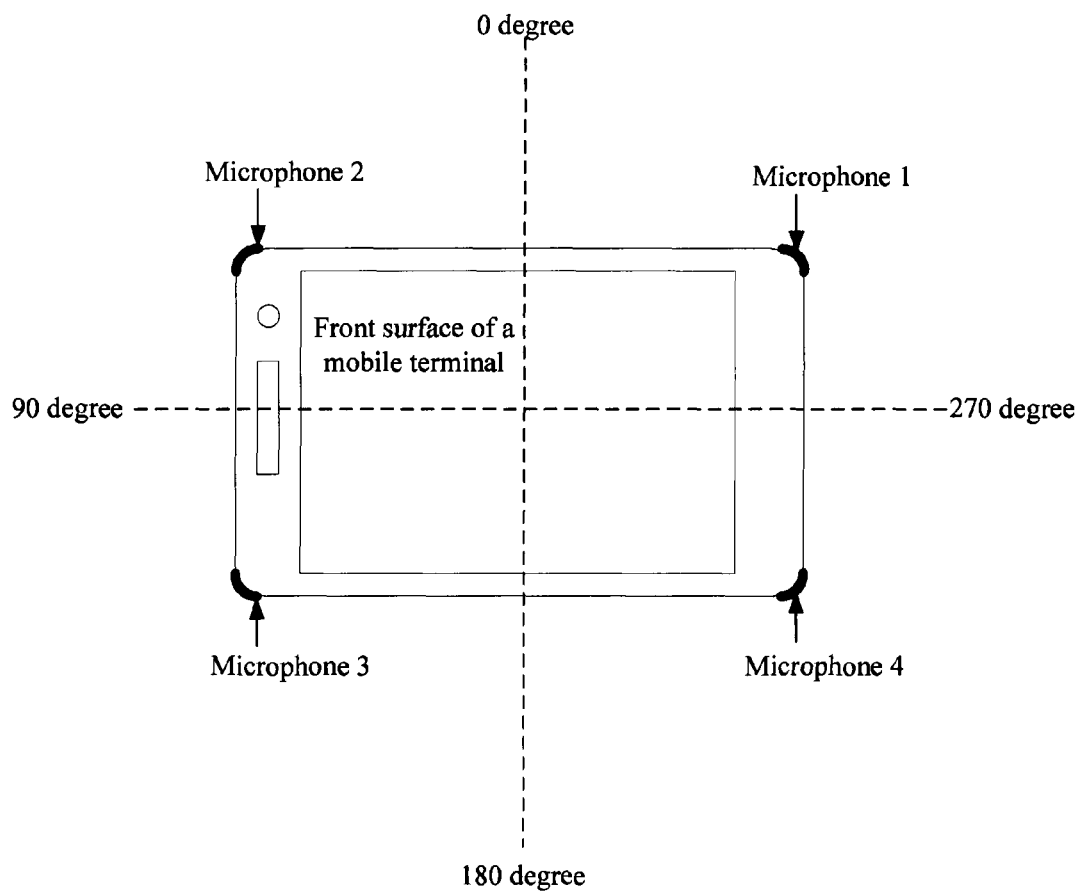
FIG. 2C is a schematic structural diagram of an application scenario of sound signal processing according to an embodiment of the present invention.

For example, in this embodiment, as shown in FIG. 2C, a manner for laying the microphones on the mobile terminal may be separately laying the microphones on four angles on the mobile terminal, and the four microphones on the mobile terminal are responsible for acquiring the sound signals of the three-dimensional sound field. Then, a location of the sound source is estimated by using the acquired sound signals and gain processing is performed on the acquired sound signals.

For example, as shown in FIG. 2C, the three-dimensional sound field is measured by using the four microphones laid on the mobile terminal, where the acquired sound signals are separately marked as $y_1(n)$, $y_2(n)$, $y_3(n)$, and $y_4(n)$. First, one microphone is selected as a reference microphone, and a time difference of arrival between a signal acquired by another microphone and a signal acquired by the microphone is calculated. Herein, a microphone 1 is selected as the reference microphone, and, by using a generalized cross-correlation algorithm, time differences $\hat{\tau}_m$, m=2, 3, 4 of arrival between a microphone 2, a microphone 3, a microphone 4, and a microphone 1 is calculated as follows:

$$\hat{\tau}_m = \arg\max_p r_{y_1 y_m}(p)$$

where:

$$r_{y_1 y_m}(p) = F^{-1}\{\Psi_{y_1 y_m}(f)\}$$
$$= \int_{-\infty}^{\infty} \Psi_{y_1 y_m}(f) e^{j2\pi fp} df$$
$$= \int_{-\infty}^{\infty} \Phi(f) S_{y_1 y_m}(f) e^{j2\pi fp} df,$$

and
$F^{-1}\{\bullet\}$ represents discrete-time Fourier transform, $S_{y_1 y_m}(f) = E\{Y_1^*(f) Y_m(f)\}$ is a correlated spectrum between $y_1(n)$ and $y_m(n)$, $$Y_m(f) = \sum_k y_m(n) e^{-j2\pi fk},$$

and $\Phi(f)$ is a weight function of one frequency domain. $\{\bullet\}^*$ represents complex conjugate.

Then, an incident angle between the sound source and the mobile terminal, that is, the direction θ of the sound source relative to the mobile terminal, is calculated according to the time difference of arrival, laying locations of the microphones on the mobile terminal, and a relationship between locations of the microphones. A specific calculation process is as follows:

$$\hat{\theta}_2 = \arcsin\left(\frac{\tau_2 c}{h}\right)$$
$$\hat{\theta}_3 = \arccos\left(\frac{\tau_3 c}{\sqrt{d^2 + h^2}}\right) - \alpha$$
$$\hat{\theta}_4 = \arccos\left(\frac{\tau_4 c}{d}\right)$$
$$\theta = \sum_{m=2}^{4} \hat{\theta}_m$$

where c represents a sound speed and is generally 340 meters per second (m/s), d represents a distance between the microphone 1 and the microphone 4 and is equal to a distance between the microphone 2 and the microphone 3, and h represents a distance between the microphone 1 and the microphone 2 and is equal to a distance between the microphone 3 and the microphone 4.

Figure 2D:
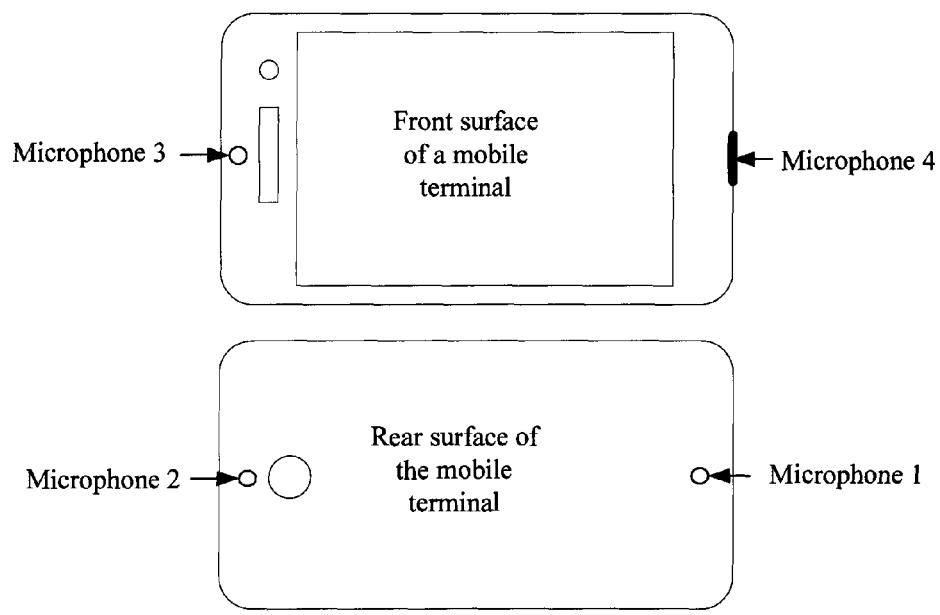
FIG. 2D is a schematic structural diagram of another application scenario of sound signal processing according to an embodiment of the present invention.

For another example, in this embodiment, as shown in FIG. 2D, a manner for laying the microphones on the mobile terminal may be laying one microphone separately on a bottom side of the mobile terminal, near a front earpiece, near a rear camera, and near a rear bottom side, and each microphone is responsible for acquiring a sound signal of the three-dimensional sound field. Then, a location of the sound source is estimated by using the acquired sound signals and gain processing is performed on the acquired sound signals.

Figure 2E:
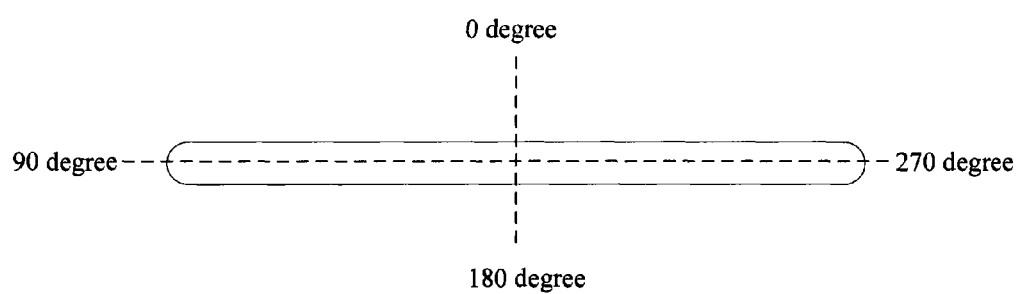
FIG. 2E is a schematic structural diagram of still another application scenario of sound signal processing according to an embodiment of the present invention.

For example, as shown in FIG. 2D and FIG. 2E, the three-dimensional sound field is measured by using the four microphones laid on the mobile terminal, where the acquired sound signals are separately marked as $y_1(n)$, $y_2(n)$, $y_3(n)$, and $y_4(n)$. First, one microphone is selected as a reference microphone, and a time difference of arrival between a signal acquired by another microphone and a signal acquired by the microphone is calculated. Herein, a microphone 1 is selected as the reference microphone, and, by using a generalized cross-correlation algorithm, time differences $\hat{\tau}_m$, m=2, 3, 4 of arrival between a microphone 2, a microphone 3, a microphone 4, and a microphone 1 is calculated as follows:

$$\hat{\tau}_m = \arg\max_p r_{y_1 y_m}(p)$$

where:

$$r_{y_1 y_m}(p) = F^{-1}\{\Psi_{y_1 y_m}(f)\}$$
$$= \int_{-\infty}^{\infty} \Psi_{y_1 y_m}(f) e^{j2\pi fp} df$$
$$= \int_{-\infty}^{\infty} \Phi(f) S_{y_1 y_m}(f) e^{j2\pi fp} df,$$

and
$F^{-1}\{\bullet\}$ represents discrete-time Fourier transform $S_{y_1 y_m}(f) = E\{Y_1^*(f) Y_m(f)\}$ is a correlated spectrum between $y_1(n)$ and $y_m(n)$, $$Y_m(f) = \sum_k y_m(n) e^{-j2\pi fk},$$

and $\Phi(f)$ is a weight function of one frequency domain. $\{\bullet\}^*$ represents complex conjugate.

Then, an incident angle of the sound source, that is, the direction θ of the sound source relative to the mobile terminal, is calculated according to the time difference of arrival, laying locations of the microphones on the mobile terminal, and a relationship between locations of the microphones. In FIG. 2E, it is assumed that coordinates of the microphone 1 are $(x_1, y_1)$, coordinates of the microphone 2 are $(x_2, y_2)$, coordinates of the microphone 3 are $(x_3, y_3)$ coordinates of the microphone 4 are $(x_4, y_4)$. A relationship between the direction θ of the sound source relative to the mobile terminal and the time difference of arrival is as follows:

$$\hat{\tau}_2 = \frac{(y_2 \cos\theta - x_2 \sin\theta) - (y_1 \cos\theta - x_1 \sin\theta)}{c}$$
$$\hat{\tau}_3 = \frac{(y_3 \cos\theta - x_3 \sin\theta) - (y_1 \cos\theta - x_1 \sin\theta)}{c}$$
$$\hat{\tau}_4 = \frac{(y_4 \cos\theta - x_4 \sin\theta) - (y_1 \cos\theta - x_1 \sin\theta)}{c},$$

where c represents a sound speed and is generally 340 m/s.

Figure 3:
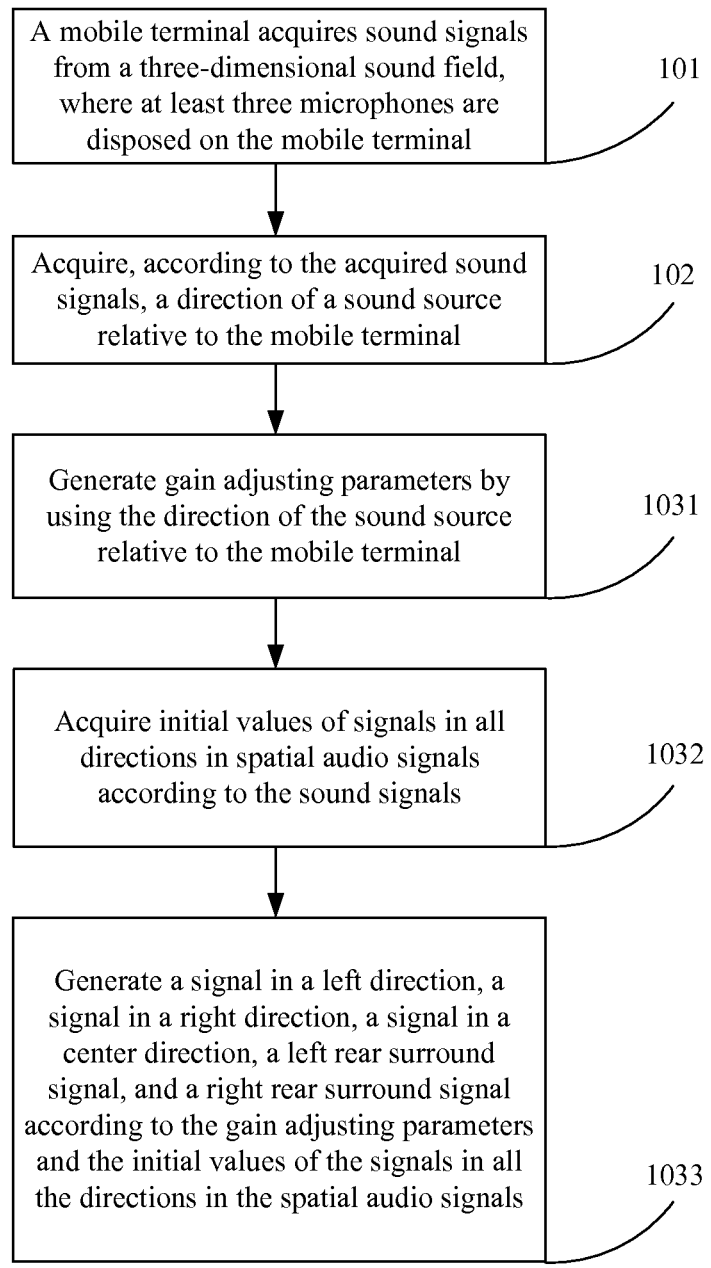
FIG. 3 is a flowchart of a sound signal processing method according to an embodiment of the present invention.

Further, in this embodiment, after the direction of the sound source relative to the mobile terminal is acquired, a gain adjusting parameter of a signal in each sound channel needs further to be calculated according to the acquired direction of the sound source relative to the mobile terminal. Therefore, as shown in FIG. 3, step 103 may be implemented as step 1031.

Step 1031: Generate gain adjusting parameters by using the direction of the sound source relative to the mobile terminal.

The gain adjusting parameters include a first-type gain adjusting parameter $\alpha_F$ corresponding to the signal in the left direction, the signal in the right direction, and the signal in the center direction, a first-type gain adjusting parameter $\alpha_B$ corresponding to the left rear surround signal and the right rear surround signal, a second-type gain adjusting parameter $\alpha_L$ corresponding to the signal in the left direction and the left rear surround signal, and a second-type gain adjusting parameter $\alpha_R$ corresponding to the signal in the right direction and the right rear surround signal; and in addition, for the direction of the sound source relative to the mobile terminal, when $\theta \in [0,90) \forall (270,360)$, $\alpha_F > \alpha_B$, when $\theta \in (90, 270)$, $\alpha_F < \alpha_B$, when $\theta \in (0,180)$, $\alpha_L > \alpha_R$, and when $\theta \in (180, 360)$, $\alpha_L < \alpha_R$.

Step 1031 includes steps 1031a, 1031b, 1031c, and 1031d.

Step 1031a: Generate, according to $$\alpha_F = \begin{cases} \alpha_{F,max1}, \theta = 0 \\ \alpha_{F,max1} + \frac{\alpha_{F,med1} - \alpha_{F,max1}}{90}\theta, \theta \in (0, 90) \\ \alpha_{F,med1}, \theta = 90 \\ \alpha_{F,med1} + \frac{\alpha_{F,min} - \alpha_{F,med1}}{90}(\theta - 90), \theta \in (90, 180) \\ \alpha_{F,min}, \theta = 180 \\ \alpha_{F,min} + \frac{\alpha_{F,med2} - \alpha_{F,min}}{90}(\theta - 180), \theta \in (180, 270) \\ \alpha_{F,med2}, \theta = 270 \\ \alpha_{F,med2} + \frac{\alpha_{F,max2} - \alpha_{F,med2}}{90}(\theta - 270), \theta \in (270, 360) \end{cases},$$

a first-type gain adjusting parameter $\alpha_F$ corresponding to a signal in a left direction, a signal in a right direction, and a signal in a center direction.

Step 1031b: Generate, according to $$\alpha_B = \begin{cases} \alpha_{B,min1}, \theta = 0 \\ \alpha_{B,min1} + \frac{\alpha_{B,med1} - \alpha_{B,min1}}{90}\theta, \theta \in (0, 90) \\ \alpha_{B,med1}, \theta = 90 \\ \alpha_{B,med1} + \frac{\alpha_{B,max} - \alpha_{B,med1}}{90}(\theta - 90), \theta \in (90, 180) \\ \alpha_{B,max}, \theta = 180 \\ \alpha_{B,max} + \frac{\alpha_{B,med2} - \alpha_{B,max}}{90}(\theta - 180), \theta \in (180, 270) \\ \alpha_{B,med2}, \theta = 270 \\ \alpha_{B,med2} + \frac{\alpha_{B,min2} - \alpha_{B,med2}}{90}(\theta - 270), \theta \in (270, 360) \end{cases},$$

a first-type gain adjusting parameter $\alpha_B$ corresponding to a left rear surround signal and a right rear surround signal, where $\alpha_{F, min}$, $\alpha_{F, med1}$, $\alpha_{F, max1}$, $\alpha_{F, med2}$, $\alpha_{F, max2}$, $\alpha_{B, min1}$, $\alpha_{B, med1}$, $\alpha_{B, min2}$, $\alpha_{B, med2}$, and $\alpha_{B, max}$ are constants greater than zero, and $\alpha_{F, min} < \alpha_{F, med1} < \alpha_{F, max1}$, $\alpha_{F, min} < \alpha_{F, med2} < \alpha_{F, max2}$, $\alpha_{B, min1} < \alpha_{B, med1} < \alpha_{B, max}$, $\alpha_{B, min2} < \alpha_{B, med2} < \alpha_{B, max}$, $\alpha_{B, med1} = \alpha_{F, med1}$, and $\alpha_{B, med2} = \alpha_{F, med2}$.

Step 1031c: Generate, according to $$\alpha_L = \begin{cases} \alpha_{L,med1}, \theta = 0 \\ \alpha_{L,med1} + \frac{\alpha_{L,max} - \alpha_{L,med1}}{90}\theta, \theta \in (0, 90) \\ \alpha_{L,max}, \theta = 90 \\ \alpha_{L,max} + \frac{\alpha_{L,med2} - \alpha_{L,max}}{90}(\theta - 90), \theta \in (90, 180) \\ \alpha_{L,med2}, \theta = 180 \\ \alpha_{L,med2} + \frac{\alpha_{L,min} - \alpha_{L,med2}}{90}(\theta - 180), \theta \in (180, 270) \\ \alpha_{L,min}, \theta = 270 \\ \alpha_{L,min} + \frac{\alpha_{L,med1} - \alpha_{L,min}}{90}(\theta - 270), \theta \in (270, 360) \end{cases},$$

a second-type gain adjusting parameter $\alpha_L$ corresponding to the signal in the left direction and the left rear surround signal.

Step 1031d: Generate, according to $$\alpha_R = \begin{cases} \alpha_{R,med1}, \theta = 0 \\ \alpha_{R,med1} + \frac{\alpha_{R,min} - \alpha_{R,med1}}{90}\theta, \theta \in (0, 90) \\ \alpha_{R,min}, \theta = 90 \\ \alpha_{R,min} + \frac{\alpha_{R,med2} - \alpha_{R,min}}{90}(\theta - 90), \theta \in (90, 180) \\ \alpha_{R,med2}, \theta = 180 \\ \alpha_{R,med2} + \frac{\alpha_{R,max} - \alpha_{R,med2}}{90}(\theta - 180), \theta \in (180, 270) \\ \alpha_{R,max}, \theta = 270 \\ \alpha_{R,max} + \frac{\alpha_{R,med1} - \alpha_{R,max}}{90}(\theta - 270), \theta \in (270, 360) \end{cases},$$

a second-type gain adjusting parameter $\alpha_R$ corresponding to the signal in the right direction and the right rear surround signal, where $\alpha_{L, med1}$, $\alpha_{L, max}$, $\alpha_{L, med2}$, $\alpha_{L, min}$, $\alpha_{R, med1}$, $\alpha_{R, min}$, $\alpha_{R, med2}$, and $\alpha_{R, max}$ are constants greater than zero, $\alpha_{L, min} < \alpha_{L, med1} < \alpha_{L, max}$, $\alpha_{L, min} < \alpha_{L, med2} < \alpha_{L, max}$, $\alpha_{R, min} < \alpha_{R, med1} < \alpha_{R, max}$, $\alpha_{R, min} < \alpha_{R, med2} < \alpha_{R, max}$, $\alpha_{L, med1} = \alpha_{R, med1}$, and $\alpha_{L, med2} = \alpha_{R, med2}$.

In this embodiment of the present invention, information about the direction of the sound source relative to the mobile terminal is obtained according to estimation on the location of the sound source, the gain adjusting parameter of a signal in each sound channel is calculated, and then a final 5.1 channel surround sound output signal is obtained by multiplying the signal of each sound channel by a corresponding gain adjusting parameter. Generally, adjustment needs to be performed on gains in a left direction, in a center direction, in a right direction, in a left rear surround direction, and in a right rear surround direction of 5.1 sound channel signals. Certainly, adjustment may also be performed only on gains in the left direction, in the right direction, in the left rear surround direction, and in the right rear surround direction.

Step 1032: Acquire initial values of the signals in all the directions in the spatial audio signals according to the sound signals, where $S_L(n)$ represents an initial value of the signal in the left direction, $S_C(n)$ represents an initial value of the signal in the center direction, $S_R(n)$ represents an initial value of the signal in the right direction, $S_{LS}(n)$ represents an initial value of the left rear surround signal, and $S_{RS}(n)$ represents an initial value of the right rear surround signal.

Further, the acquiring initial values of the signals in all the directions in the spatial audio signals according to the sound signals requires calculation performed by acquiring a beam with heart-shaped directivity. The beam with heart-shaped directivity may be obtained by using a beamforming algorithm on the sound signals received by the 1st microphone to the 4th microphone. Step 1032 may be implemented as follows.

Step 1032$b_1$: Acquire a beam $BF_{ij}(n)$ with heart-shaped directivity by using the sound signals received by the 1st to the 4th microphones, where a point of a maximum directivity of $BF_{ij}(n)$ is in a direction pointing from a connecting line between the $i^{th}$ microphone and a $j^{th}$ microphone to the $i^{th}$ microphone, and a zero point of directivity of $BF_{ij}(n)$ is in a direction pointing from the connecting line between the $i^{th}$ microphone and the $j^{th}$ microphone to the $j^{th}$ microphone, where i and j are equal to 1, 2, 3, or 4.

Step 1032$b_2$: Acquire beams $BF_L(n)$, $BF_R(n)$, $BF_{LS}(n)$, and $BF_{RS}(n)$ with heart-shaped directivity according to $$\begin{cases} BF_L(n) = \frac{BF_{21}(n) + BF_{23}(n)}{2} \\ BF_R(n) = \frac{BF_{12}(n) + BF_{14}(n)}{2} \\ BF_{LS}(n) = \frac{BF_{32}(n) + BF_{34}(n)}{2} \\ BF_{RS}(n) = \frac{BF_{41}(n) + BF_{43}(n)}{2} \end{cases}.$$

The beams $BF_L(n)$, $BF_R(n)$, $BF_{LS}(n)$, and $BF_{RS}(n)$ with heart-shaped directivity are acquired, where a maximum directivity of $BF_L(n)$ is within $(0,90°)$ a maximum directivity of $BF_{LS}(n)$ is within $(90°,180°)$, a maximum directivity of $BF_{RS}(n)$ is within $(180°,270°)$, and a maximum directivity of $BF_R(n)$ is within $(270°,360°)$.

The initial value of the signal in the left direction $S_L(n) = BF_L(n)$, the initial value of the signal in the center direction $$S_C(n) = \frac{BF_L(n) + BF_R(n)}{2},$$

the initial value of the signal in the right direction $S_R(n) = BF_R(k)$ the initial value of the left rear surround signal $S_{LS}(n) = BF_{LS}(n)$, and the initial value of the right rear surround signal $S_{RS}(n) = BF_{RS}(n)$, where $S_L(n)$ represents the initial value of the signal in the left direction, $S_C(n)$ represents the initial value of the signal in the center direction, $S_R(n)$ represents the initial value of the signal in the right direction, $S_{LS}(n)$ represents the initial value of the left rear surround signal, $S_{RS}(n)$ represents the initial value of the right rear surround signal, and n represents a sampling point number.

For example, in an application scenario shown in FIG. 2C, at the same time when the location of the sound source is estimated, enhancement processing needs to be further performed on original sound signals in multiple directions collected by the microphones laid on the mobile terminal. A difference beamforming method is used herein. According to a first-order difference beamforming algorithm, beams with heart-shaped directivity in two directions generated by using original input signals of the microphone 1 and the microphone 3 that are on a diagonal are marked as $BF_R(n)$ and $BF_{LS}(n)$, and in addition, beams with heart-shaped directivity in two directions generated by using original input signals of the microphone 2 and the microphone 4 that are on a diagonal are marked as $BF_L(n)$ and $BF_{RS}(n)$, where $BF_L(n)$, $BF_R(n)$, $BF_{LS}(n)$, and $BF_{RS}(n)$ are signals in the multiple directions obtained after the enhancement processing.

For another example, in application scenarios shown in FIG. 2D and FIG. 2E, at the same time when the location of the sound source is estimated, enhancement processing needs to be further performed on a multi-channel original input signal collected by the microphones laid on the mobile terminal. A difference beamforming method is used herein. According to a first-order difference beamforming algorithm, beams with heart-shaped directivity in two directions generated by using original input signals of the microphone 1 and the microphone 4 are marked as $BF_{14}(n)$ and $BF_{41}(n)$, where a point of a maximum directivity of $BF_{14}(n)$ is in a direction to the microphone 1 and a zero point of directivity of $BF_{14}(n)$ is in a direction to the microphone 4, and a point of a maximum directivity of $BF_{41}(n)$ is in a direction to the microphone 4 and a zero point of directivity of $BF_{41}(n)$ is in a direction to the microphone 1. Beams with heart-shaped directivity in two directions generated by using original input signals of the microphone 2 and the microphone 3 are marked as $BF_{23}(n)$ and $BF_{32}(n)$, where a point of a maximum directivity of $BF_{23}(n)$ is in a direction to the microphone 2 and a zero point of directivity of $BF_{23}(n)$ is in a direction to the microphone 3, and a point of a maximum directivity of $BF_{32}(n)$ is in a direction to the microphone 3 and a zero point of directivity of $BF_{32}(n)$ is in a direction to the microphone 2. Beams with heart-shaped directivity in two directions generated by using original input signals of the microphone 1 and the microphone 2 are marked as $BF_{12}(n)$ and $BF_{21}(n)$, where a point of a maximum directivity of $BF_{12}(n)$ is in a direction to the microphone 1 and a zero point of directivity of $BF_{12}(n)$ is in a direction to the microphone 2, and a point of a maximum directivity of $BF_{21}(n)$ is in a direction to the microphone 2 and a zero point of directivity of $BF_{21}(n)$ is in a direction to the microphone 1. Beams with heart-shaped directivity in two directions generated by using original input signals of the microphone 3 and the microphone 4 are marked as $BF_{34}(n)$ and $BF_{43}(n)$, where a point of a maximum directivity of $BF_{34}(n)$ is in a direction to the microphone 3 and a zero point of directivity of $BF_{34}(n)$ is in a direction to the microphone 4, and a point of a maximum directivity of $BF_{43}(n)$ is in a direction to the microphone 4 and a zero point of directivity of $BF_{43}(n)$ is in a direction to the microphone 3. If it is assumed that signals in multiple channels obtained after the enhancement processing are marked as $BF_L(n)$, $BF_R(n)$, $BF_{LS}(n)$, and $BF_{RS}(n)$, relationships between the beams are as follows:

$$BF_L(n) = \frac{BF_{21}(n) + BF_{23}(n)}{2}$$

$$BF_R(n) = \frac{BF_{12}(n) + BF_{14}(n)}{2}$$

$$BF_{LS}(n) = \frac{BF_{32}(n) + BF_{34}(n)}{2}$$

$$BF_{RS}(n) = \frac{BF_{41}(n) + BF_{43}(n)}{2}.$$

In this embodiment, a beam with heart-shaped directivity is obtained by using a difference beamforming method, and the initial values of the signals in all the directions in the spatial audio signals can be acquired by using the beam with heart-shaped directivity, so that signals in all the directions in the spatial audio signals can be subsequently calculated.

Therefore, after implementation of step 1032 is complete, the following is further included.

Step 1033: Generate the signals in all the directions in the spatial audio signals according to the gain adjusting parameters and the initial values of the signals in all the directions in the spatial audio signals.

Step 1033 may be implemented as step 1033a, including the following.

Step 1033a: Acquire the signal $S_{L,\,final}(n)$ in the left direction, the signal $S_{C,\,final}(n)$ in the center direction, the signal $S_{R,\,final}(n)$ in the right direction, the left rear surround direction signal $S_{LS,\,final}(n)$, and the right rear surround signal $S_{RS,\,final}(n)$ according to $$\begin{cases} S_{L,final}(n) = S_L(n) * \alpha_F * \alpha_L \\ S_{C,final}(n) = S_C(n) * \alpha_F \\ S_{R,final}(n) = S_R(n) * \alpha_F * \alpha_R \\ S_{LS,final}(n) = S_{LS}(n) * \alpha_B * \alpha_L \\ S_{RS,final}(n) = S_{RS}(n) * \alpha_B * \alpha_R \end{cases},$$

where $S_L(n)$ represents the initial value of the signal in the left direction, $S_C(n)$ represents the initial value of the signal in the center direction, $S_R(n)$ represents an initial value of the signal in the right direction, $S_{LS}(n)$ represents the initial value of the left rear surround signal, $S_{RS}(n)$ represents the initial value of the right rear surround signal, and n represents a sampling point number.

For example, in an application scenario shown in FIG. 2C, according to a result of the estimation on the location of the sound source, the enhanced signals in the multiple channels, and a type of a playback system, a corresponding method is selected for performing reconstruction on the spatial audio signals to obtain final spatial audio output signals.

If the playback system is a 5.1 channel surround sound system, enhanced output signals in four directions need to be mapped to signals in six directions required for playback by the 5.1 channel surround sound system, and in addition, spatial sound field enhancement adjustment is performed, according to the result of the estimation on the location of the sound source, on signals in the six directions obtained after the mapping, so that final output signals are obtained. $BF_L(n)$ may be directly used as a signal in a left direction in 5.1 sound channel signals, $BF_R(n)$ may be directly used as a signal in a right direction in the 5.1 sound channel signals, an average of $BF_L(n)$ and $BF_R(n)$ may be taken as a signal in a center direction, $BF_{LS}(n)$ may be directly used as a left rear surround signal in the 5.1 sound channel signals, $BF_{RS}(n)$ may be directly used as a right rear surround signal in the 5.1 sound channel signals, an average value of the signals $BF_L(n)$, $BF_R(n)$, $BF_{LS}(n)$, and $BF_{RS}(n)$ in four directions may be taken, and then 150 Hz low-pass filtering processing is performed on the average value to obtain a super bass signal in the 5.1 sound channel signals.

A gain adjusting parameter of a signal in each direction is calculated according to the direction θ that is of the sound source relative to the mobile terminal and is obtained by means of the estimation on the location of the sound source. A final 5.1 channel surround sound output signal is obtained by multiplying the signal of each sound channel by a corresponding gain adjusting parameter. In the final 5.1 channel surround sound output signals, the signal in the left direction is represented as $S_{L,\,final}(n)$, the signal in the center direction is represented as $S_{C,\,final}(n)$, the signal in the right direction is represented as $S_{R,\,final}(n)$, the left rear surround signal is represented as $S_{LS,\,final}(n)$, and the right rear surround signal is represented as $S_{RS,\,final}(n)$, where:

$$S_{L,final}(n) = BF_L(n) * \alpha_F * \alpha_L$$
$$S_{C,final}(n) = \frac{BF_L(n) + BF_R(n)}{2} * \alpha_F$$
$$S_{R,final}(n) = BF_R(n) * \alpha_F * \alpha_R$$
$$S_{LS,final}(n) = BF_{LS}(n) * \alpha_B * \alpha_L$$
$$S_{RS,final}(n) = BF_{RS}(n) * \alpha_B * \alpha_R.$$

If the playback system is a stereo speaker, the second-type gain adjusting parameter may be calculated according to the direction θ that is of the sound source relative to the mobile terminal and is obtained by means of the estimation on the location of the sound source. In the final 5.1 channel surround sound output signals, the signal in the left direction is represented as $S_{L,\,final}(n)$, the signal in the center direction is represented as $S_{C,\,final}(n)$, the signal in the right direction is represented as $S_{R,\,final}(n)$, the left rear surround signal is represented as $S_{LS,\,final}(n)$, and the right rear surround signal is represented as $S_{RS,\,final}(n)$, where:

$$S_{L,final}(n) = S_L(n) * \alpha_L$$

$$S_{C,final}(n) = S_C(n)$$

$$S_{R,final}(n) = S_R(n) * \alpha_R$$

$$S_{LS,final}(n) = S_{LS}(n) * \alpha_L$$

$$S_{RS,final}(n) = S_{RS}(n) * \alpha_R.$$

Then, output signals obtained after the spatial sound field enhancement adjustment, such as the signal $S_{L,\,final}(n)$ in the left direction, the signal $S_{C,\,final}(n)$ in the center direction, the signal $S_{R,\,final}(n)$ in the right direction, the left rear surround signal $S_{LS,\,final}(n)$, and the right rear surround signal $S_{RS,\,final}(n)$, may be downmixed, by performing step 1034, into a two-channel signal for outputting.

For another example, in application scenarios shown in FIG. 2D and FIG. 2E, according to a result of the estimation on the location of the sound source, the enhanced signals in the multiple channels, and a type of a playback system, a corresponding method is selected for performing reconstruction on the spatial audio signals to obtain final spatial audio output signals.

If the playback system is a 5.1 channel surround sound system, enhanced output signals in four directions need to be mapped to signals in six directions required for playback by the 5.1 channel surround sound system, and in addition, spatial sound field enhancement adjustment is performed, according to the result of the estimation on the location of the sound source, on signals in the six directions obtained after the mapping, so that final output signals are obtained. $BF_L(n)$ may be directly used as a signal in a left direction in 5.1 sound channel signals, $BF_R(n)$ may be directly used as a signal in a right direction in the 5.1 sound channel signals, an average of $BF_L(n)$ and $BF_R(n)$ may be taken as a signal in a center direction, $BF_{LS}(n)$ may be directly used as a left rear surround signal in the 5.1 sound channel signals, $BF_{RS}(n)$ may be directly used as a right rear surround signal in the 5.1 sound channel signals, an average value of the signals $BF_L(n)$, $BF_R(n)$, $BF_{LS}(n)$, and $BF_{RS}(n)$ in four directions may be taken, and then 150 Hz low-pass filtering processing is performed on the average value to obtain a super bass signal in the 5.1 sound channel signals.

A gain adjusting parameter of a signal in each sound channel is calculated according to the direction θ that is of the sound source relative to the mobile terminal and is obtained by means of the estimation on the location of the sound source. A final 5.1 channel surround sound output signal is obtained by multiplying the signal of each sound channel by a corresponding gain adjusting parameter. In the final 5.1 channel surround sound output signals, the signal in the left direction is represented as $S_{L, final}(n)$, the signal in the center direction is represented as $S_{C, final}(n)$, the signal in the right direction is represented as $S_{R, final}(n)$, the left rear surround signal is represented as $S_{LS, final}(n)$, and the right rear surround signal is represented as $S_{RS, final}(n)$, where:

$$S_{L,final}(n) = BF_L(n) * \alpha_F * \alpha_L$$

$$S_{C,final}(n) = \frac{BF_L(n) + BF_R(n)}{2} * \alpha_F$$

$$S_{R,final}(n) = BF_R(n) * \alpha_F * \alpha_R$$

$$S_{LS,final}(n) = BF_{LS}(n) * \alpha_B * \alpha_L$$

$$S_{RS,final}(n) = BF_{RS}(n) * \alpha_B * \alpha_R.$$

If the playback system is a stereo speaker, the second-type gain adjusting parameter may be calculated according to the direction θ that is of the sound source relative to the mobile terminal and is obtained by means of the estimation on the location of the sound source. In the final 5.1 channel surround sound output signals, the signal in the left direction is represented as $S_{L, final}(n)$, the signal in the center direction is represented as $S_{C, final}(n)$, the signal in the right direction is represented as $S_{R, final}(n)$, the left rear surround signal is represented as $S_{LS, final}(n)$, and the right rear surround signal is represented as $S_{RS, final}(n)$, where:

$$S_{L,final}(n) = S_L(n) * \alpha_L$$

$$S_{C,final}(n) = S_C(n)$$

$$S_{R,final}(n) = S_R(n) * \alpha_R$$

$$S_{LS,final}(n) = S_{LS}(n) * \alpha_L$$

$$S_{RS,final}(n) = S_{RS}(n) * \alpha_R.$$

Then, output signals obtained after the spatial sound field enhancement adjustment, such as the signal $S_{L, final}(n)$ in the left direction, the signal $S_{C, final}(n)$ in the center direction, the signal $S_{R, final}(n)$ in the right direction, the left rear surround signal $S_{LS, final}(n)$, and the right rear surround signal $S_{RS, final}(n)$, may be downmixed, by performing step 1034, into a two-channel signal for outputting.

In an application scenario of the beams $BF_L(n)$, $BF_R(n)$, $BF_{LS}(n)$, and $BF_{RS}(n)$ with heart-shaped directivity, after the beams $BF_L(n)$, $BF_R(n)$, $BF_{LS}(n)$, and $BF_{RS}(n)$ with heart-shaped directivity are obtained according to steps 1032b₁ to 1032b₂, step 1033 may be implemented as follows.

Step 1033b₁: Acquire the signal $S_{L, final}(n)$ in the left direction according to $S_{L, final}(n) = S_L(n) * \alpha_L$;

Step 1033b₂: Acquire the signal $S_{C, final}(n)$ in the center direction according to $S_{C, final}(n) = S_C(n)$;

Step 1033b₃: Acquire the signal $S_{R, final}(n)$ in the right direction according to $S_{R, final}(n) S_R(n) * \alpha_R$;

Step 1033b₄: Acquire the left rear surround signal $S_{LS, final}(n)$ according to $S_{LS, final}(n) = S_{LS}(n) * \alpha_L$; and Step 1033b₅: Acquire the right rear surround signal $S_{RS, final}(n)$ according to $S_{RS, final}(n) = S_{RS}(n) * \alpha_R$, where $S_L(n)$ represents the initial value of the signal in the left direction, $S_C(n)$ represents the initial value of the signal in the center direction, $S_R(n)$ represents the initial value of the signal in the right direction, $S_{LS}(n)$ represents the initial value of the left rear surround signal, $S_{RS}(n)$ represents the initial value of the right rear surround signal, and n represents a sampling point number.

According to the sound signal processing method provided in this embodiment of the present invention, sound signals can be acquired from a three-dimensional sound field of a mobile terminal; directions of all sound sources relative to the mobile terminal are acquired; and then, spatial audio signals used for simulating the three-dimensional sound field are obtained by using the directions of the sound sources relative to the mobile terminal and the sound signals. In a solution provided in the present invention, sound signals used for simulating a three-dimensional sound field can be collected and processed by using elements of a mobile terminal; in addition, directions, relative to the mobile terminal, of sound sources received in all directions are obtained by means of analysis; and then, an effect of the three-dimensional sound field is enhanced according to the directions, relative to the mobile terminal, of the sound sources in all the directions. In a solution in the prior art, a three-dimensional sound field is simulated by using only beams. However, in the present invention, directions, relative to the mobile terminal, of the sound sources in all the directions are acquired, and further, gain adjustment is performed on beamforming by using information about the directions; therefore, a phenomenon in which a difference between left and right directions is more obvious than a difference between front and rear directions in the simulated three-dimensional sound field can be relieved, thereby improving quality of the simulated three-dimensional sound field.

Figure 3A:
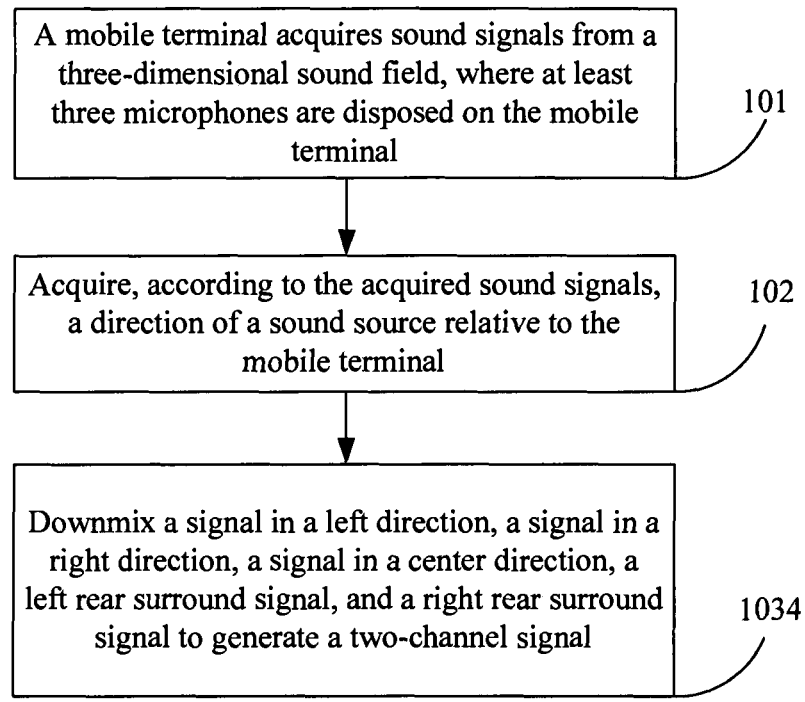
FIG. 3A is a flowchart of another sound signal processing method according to an embodiment of the present invention.

Further, in this embodiment, the spatial audio signals further include a two-channel signal; after the direction of the sound source relative to the mobile terminal is acquired, the signal in the left direction, the signal in the right direction, the signal in the center direction, the left rear surround signal, and the right rear surround signal need further to be downmixed to generate the two-channel signal. Therefore, as shown in FIG. 3A, step 103 may be implemented as step 1034.

Step 1034: Downmix the signal in the left direction, the signal in the right direction, the signal in the center direction, the left rear surround signal, and the right rear surround signal to generate the two-channel signal.

For example, if the playback system is an earphone, enhanced output signals in N directions need to be mapped to signals in the left direction, in the center direction, in the right direction, in the left rear surround direction, and in the right rear surround direction that are for playback in the 5.1 channel surround sound system, and in addition, spatial sound field enhancement adjustment is performed, according to the result of the estimation on the location of the sound source, on signals in the five directions obtained after the mapping is performed according to the foregoing method, so that output signals after the spatial sound field enhancement adjustment are obtained. For the earphone playback system, the output signals obtained after the spatial sound field enhancement adjustment need to be downmixed into the two-channel signal. One optional downmixing method is a method for downmixing a 5.1 channel surround sound of an International Telecommunication Union standard into a two-channel signal. Another method is that convolution needs to be separately performed on the signals in the left direction, in the right direction, in the left rear surround direction, and in the right rear surround direction and head transfer functions of corresponding angles before downmixing, and then downmixing is performed, so that a degree of spatial separation in the front, rear, left, and right directions after the signal downmixing can be improved.

According to the sound signal processing method provided in this embodiment of the present invention, sound signals can be acquired from a three-dimensional sound field of a mobile terminal; directions of all sound sources relative to the mobile terminal are acquired; and then, spatial audio signals used for simulating the three-dimensional sound field are obtained by using the directions of the sound sources relative to the mobile terminal and the sound signals. In a solution provided in the present invention, sound signals used for simulating a three-dimensional sound field can be collected and processed by using elements of a mobile terminal; in addition, directions, relative to the mobile terminal, of sound sources received in all directions are obtained by means of analysis; and then, an effect of the three-dimensional sound field is enhanced according to the directions, relative to the mobile terminal, of the sound sources in all the directions. In a solution in the prior art, a three-dimensional sound field is simulated by using only beams. However, in the present invention, directions, relative to the mobile terminal, of the sound sources in all the directions are acquired, and further, gain adjustment is performed on beamforming by using information about the directions; therefore, a phenomenon in which a difference between left and right directions is more obvious than a difference between front and rear directions in the simulated three-dimensional sound field can be relieved, thereby improving quality of the simulated three-dimensional sound field.

Figure 4:
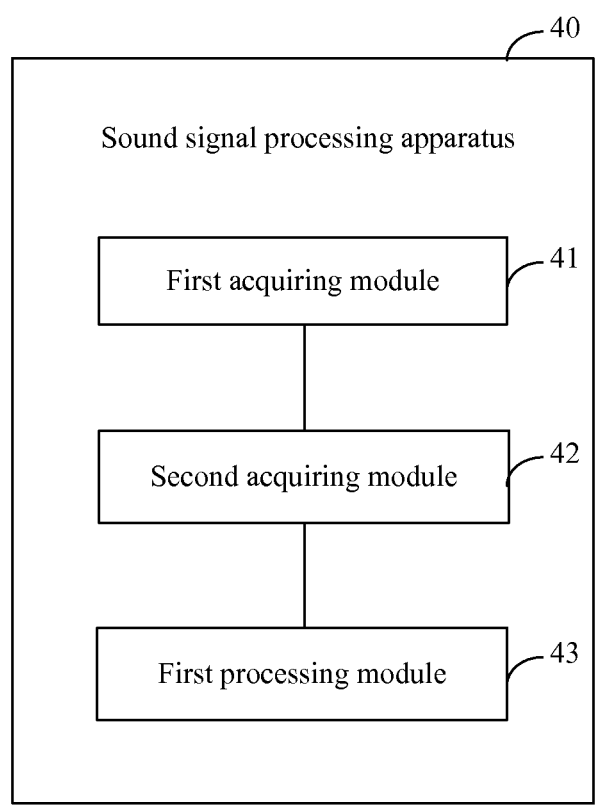
FIG. 4 is a schematic structural diagram of a sound signal processing apparatus according to an embodiment of the present invention.

An embodiment of the present invention provides a structure of a sound signal processing apparatus 40, and as shown in FIG. 4, the apparatus 40 includes a first acquiring module 41 configured to acquire sound signals from a three-dimensional sound field, where at least three microphones are disposed on the mobile terminal and one microphone is configured to receive a sound signal in at least one direction; a second acquiring module 42 configured to acquire, according to the acquired sound signals, a direction of a sound source relative to the mobile terminal; and a first processing module 43 configured to obtain spatial audio signals according to the direction of the sound source relative to the mobile terminal and the acquired sound signals, where the spatial audio signals are used for simulating the three-dimensional sound field.

Figure 4A:
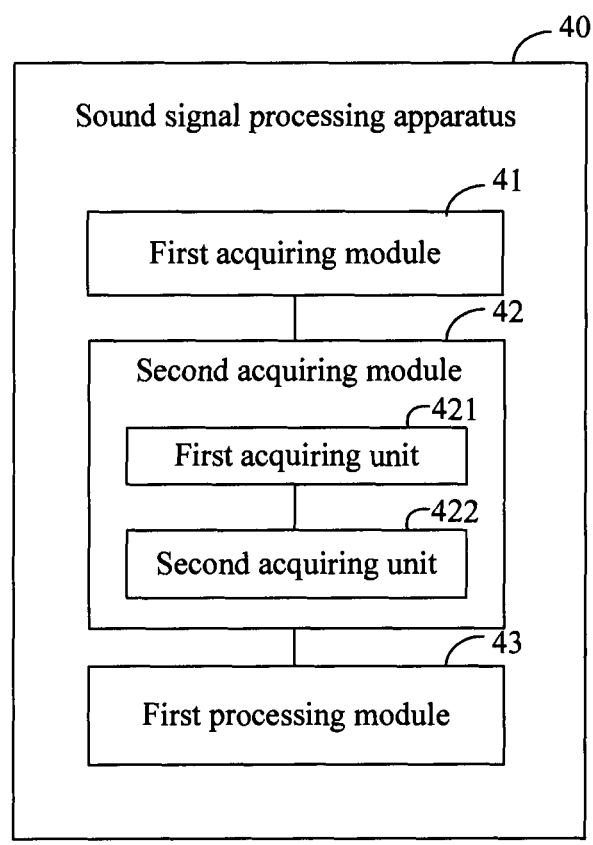
FIG. 4A, FIG. 4B, FIG. 4C, FIG. 4D, FIG. 4E, FIG. 4F, FIG. 4G, FIG. 4H, FIG. 4I, and FIG. 4J are schematic diagrams of specific structures of a sound signal processing apparatus according to an embodiment of the present invention.

As shown in FIG. 4A, the second acquiring module 42 includes a first acquiring unit 421 configured to acquire a time difference of arrival between a sound signal in one direction and a sound signal in another direction that are received by the microphones on the mobile terminal, where the microphones on the mobile terminal are configured to receive sound signals in at least four directions; and a second acquiring unit 422 configured to obtain, according to the acquired time difference of arrival and locations of the microphones on the mobile terminal on the mobile terminal, the direction of the sound source relative to the mobile terminal.

Figure 4B:
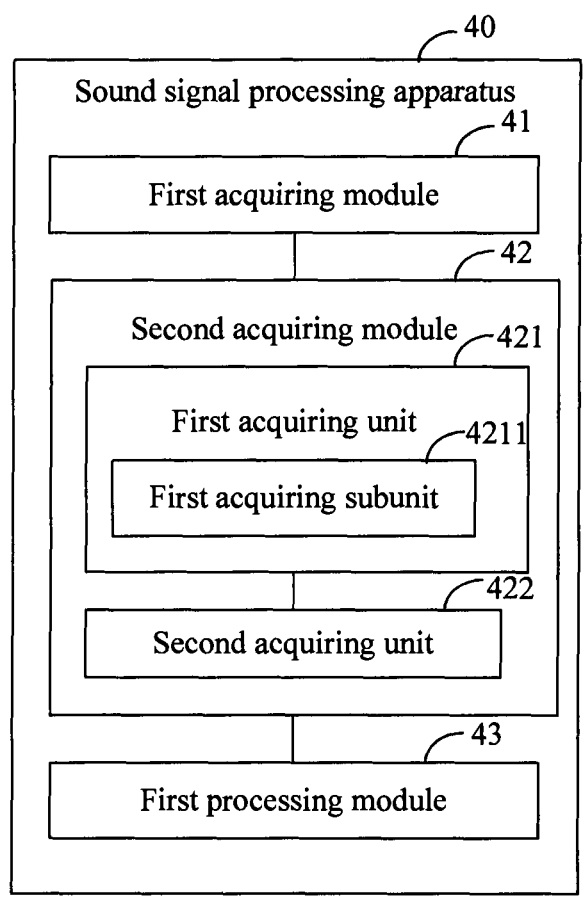

As shown in FIG. 4B, the first acquiring unit 421 includes a first acquiring subunit 4211 configured to acquire, according to $$\hat{\tau}_m = \mathrm{argmax}_p r_{y_1 y_m}(p),$$

a time difference $\hat{\tau}_m$ of arrival between a sound signal received by an $m^{th}$ microphone and a sound signal received by a $1^{st}$ microphone, where p represents a quantity of delay sampling points, $y_1(n)$ represents the sound signal received by the $1^{st}$ microphone, $y_m(n)$ represents the sound signal received by the $m^{th}$ microphone, $r_{y_1 y_m}(p) = \int_{-\infty}^{\infty} \Phi(f) S_{y_1 y_m}(f) e^{j2\pi f p} df$, $S_{y_1 y_m}(f)$ represents a correlated spectrum between $y_1(n)$ and $y_m(n)$, and $\Phi(f)$ represents a weight function of a frequency domain in which sound signals received in all directions are located.

Figure 4C:
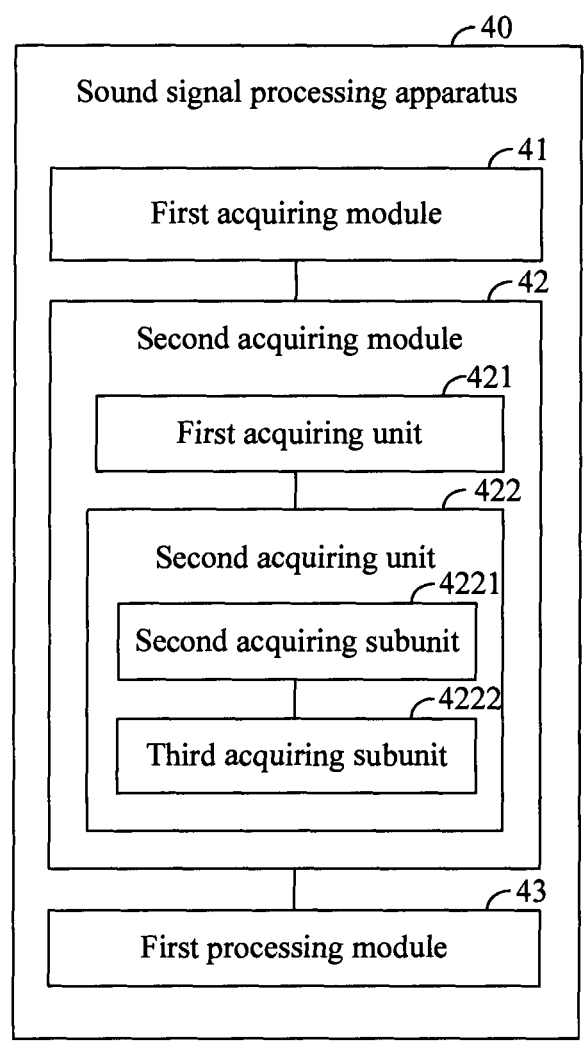

As shown in FIG. 4C, the second acquiring unit 422 includes a second acquiring subunit 4221 configured to estimate, according to $$\hat{\theta}_2 = \arcsin\left(\frac{\hat{\tau}_2 c}{h}\right),$$

a direction $\hat{\theta}_2$ of a sound signal received by a $2^{nd}$ microphone; estimate, according to $$\hat{\theta}_3 = \arccos\left(\frac{\hat{\tau}_3 c}{\sqrt{d^2 + h^2}}\right) - \alpha,$$

a direction $\hat{\theta}_3$ of a sound signal received by a $3^{rd}$ microphone; and estimate, according to $$\hat{\theta}_4 = \arccos\left(\frac{\hat{\tau}_4 c}{d}\right),$$

a direction $\hat{\theta}_4$ of a sound signal received by a $4^{th}$ microphone; and a third acquiring subunit 4222 configured to acquire, according to $$\theta = \frac{1}{3} \sum_{m=2}^{4} \hat{\theta}_m,$$

the direction $\theta$ of the sound source relative to the mobile terminal, where the $1^{st}$ microphone and the $4^{th}$ microphone are located on a same side and the $1^{st}$ microphone and the $2^{nd}$ microphone are located on a same side; and c represents a sound speed, d represents a distance between a central point of the $1^{st}$ microphone and a central point of the $4^{th}$ microphone, d is equal to a distance between a central point of the $2^{nd}$ microphone and a central point of the $3^{rd}$ microphone, h represents a distance between the central point of the $1^{st}$ microphone and the central point of the $2^{nd}$ microphone, h is equal to a distance between the central point of the $3^{rd}$ microphone and the central point of the $4^{th}$ microphone, and $\alpha$ represents an included angle between a diagonal of the mobile terminal and a side of an angle at which the $1^{st}$ microphone and the $4^{th}$ microphone are located.

Figure 4D:
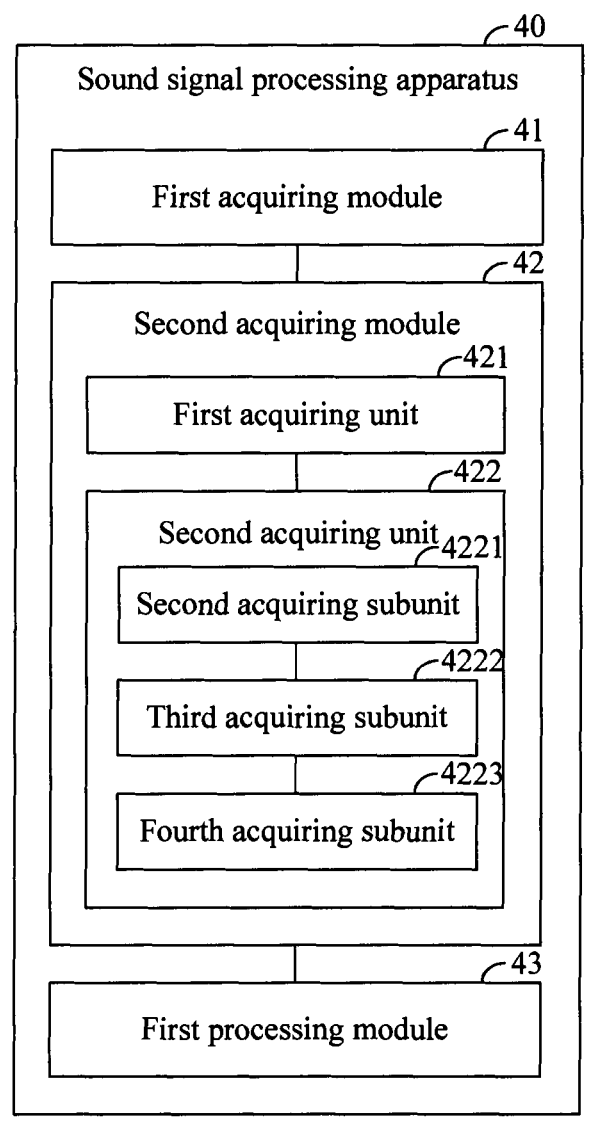

As shown in FIG. 4D, after the direction of the sound source relative to the mobile terminal is acquired, the second acquiring unit 422 further includes a fourth acquiring subunit 4223 configured to acquire, according to $$\begin{cases} \hat{\tau}_2 = \frac{(y_2\cos\theta - x_2\sin\theta) - (y_1\cos\theta - x_1\sin\theta)}{c} \\ \hat{\tau}_3 = \frac{(y_3\cos\theta - x_3\sin\theta) - (y_1\cos\theta - x_1\sin\theta)}{c} \\ \hat{\tau}_4 = \frac{(y_4\cos\theta - x_4\sin\theta) - (y_1\cos\theta - x_1\sin\theta)}{c} \end{cases},$$

the direction θ of the sound source relative to the mobile terminal, where the 1$^{st}$ microphone and the 2$^{nd}$ microphone are located on an axis of symmetry of one surface of the mobile terminal and are separately located on two parallel edges on the one surface; the 3$^{rd}$ microphone and the 4$^{th}$ microphone are located on an axis of symmetry of another surface of the mobile terminal and are separately located on two parallel edges on the another surface; and c represents a sound speed, $(x_1,y_1)$ represents coordinates corresponding to the 1$^{st}$ microphone, $(x_2,y_2)$ represents coordinates corresponding to the 2$^{nd}$ microphone, $(x_3,y_3)$ represents coordinates corresponding to the 3$^{rd}$ microphone, and $(x_4,y_4)$ represents coordinates corresponding to the 4$^{th}$ microphone.

Further, the spatial audio signals include at least a signal in a left direction, a signal in a right direction, a signal in a center direction, a left rear surround signal, and a right rear surround signal.

Figure 4E:
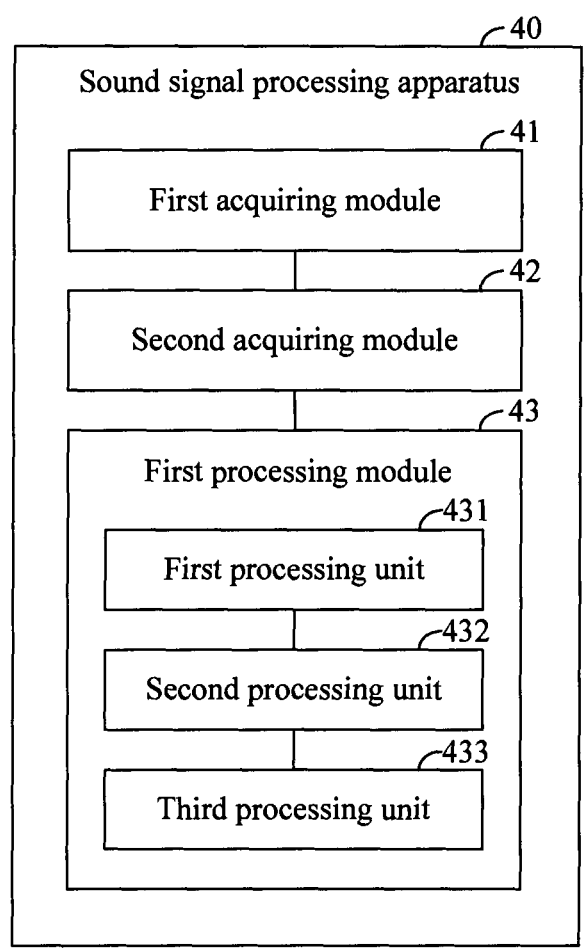

As shown in FIG. 4E, the first processing module 43 includes a first processing unit 431 configured to generate gain adjusting parameters by using the direction of the sound source relative to the mobile terminal, where the gain adjusting parameters include a first-type gain adjusting parameter $\alpha_F$ corresponding to the signal in the left direction, the signal in the right direction, and the signal in the center direction, a first-type gain adjusting parameter $\alpha_B$ corresponding to the left rear surround signal and the right rear surround signal, a second-type gain adjusting parameter $\alpha_L$ corresponding to the signal in the left direction and the left rear surround signal, and a second-type gain adjusting parameter $\alpha_R$ corresponding to the signal in the right direction and the right rear surround signal; and in addition, for the direction of the sound source relative to the mobile terminal, when $\theta \in [0,90] \forall (270,360]$, $\alpha_F > \alpha_B$, when $\theta \in (90, 270)$, $\alpha_F < \alpha_B$, when $\theta \in (0,180)$, $\alpha_L > \alpha_R$, and when $\theta \in (180, 360)$, $\alpha_L < \alpha_R$; a second processing unit 432 configured to acquire initial values of the signals in all the directions in the spatial audio signals according to the sound signals; and a third processing unit 433 configured to generate the signal in the left direction, the signal in the right direction, the signal in the center direction, the left rear surround signal, and the right rear surround signal according to the gain adjusting parameters and the initial values of the signals in all the directions in the spatial audio signals.

Figure 4F:
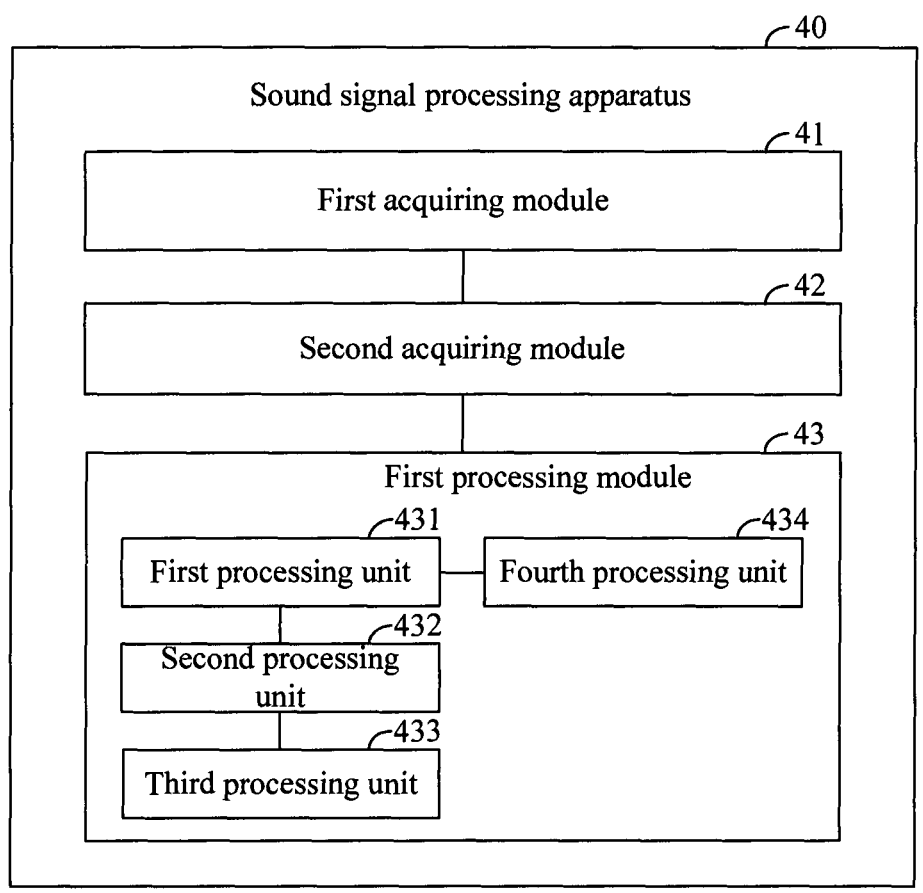

Further, the spatial audio signals further include a two-channel signal; and as shown in FIG. 4F, the apparatus 40 further includes a fourth processing unit 434 configured to downmix the signal in the left direction, the signal in the right direction, the signal in the center direction, the left rear surround signal, and the right rear surround signal to generate the two-channel signal.

Figure 4G:
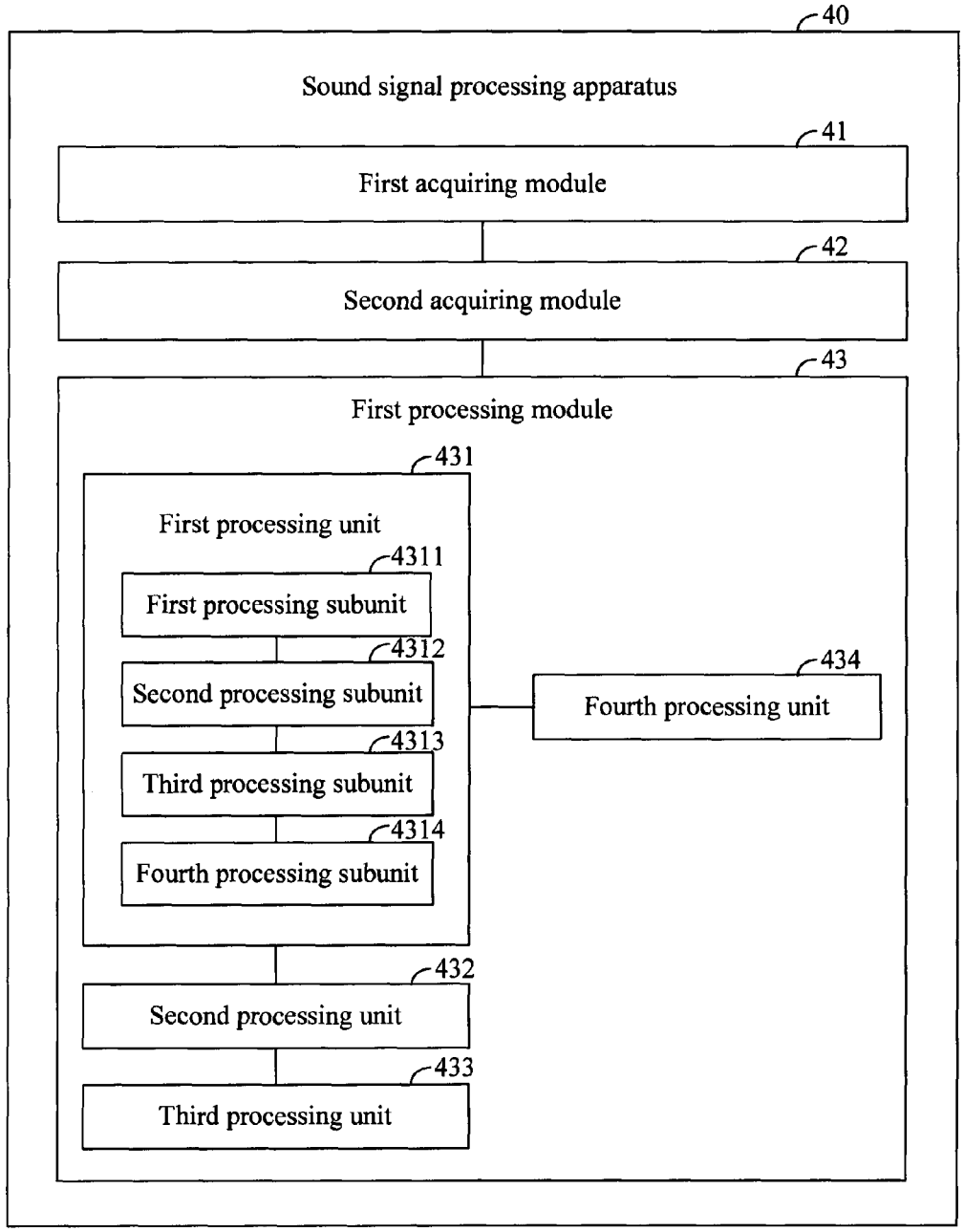

Optionally, based on the foregoing implementation manner, the following may be further included: the first processing unit 431. As shown in FIG. 4G, the first processing unit 431 includes a first processing subunit 4311 configured to generate, according to $$\alpha_F = \begin{cases} \alpha_{F,max1}, \theta = 0 \\ \alpha_{F,max1} + \frac{\alpha_{F,med1} - \alpha_{F,max1}}{90}\theta, \theta \in (0, 90) \\ \alpha_{F,med1}, \theta = 90 \\ \alpha_{F,med1} + \frac{\alpha_{F,min} - \alpha_{F,med1}}{90}(\theta - 90), \theta \in (90, 180) \\ \alpha_{F,min}, \theta = 180 \\ \alpha_{F,min} + \frac{\alpha_{F,med2} - \alpha_{F,min}}{90}(\theta - 180), \theta \in (180, 270) \\ \alpha_{F,med2}, \theta = 270 \\ \alpha_{F,med2} + \frac{\alpha_{F,max2} - \alpha_{F,med2}}{90}(\theta - 270), \theta \in (270, 360) \end{cases},$$

the first-type gain adjusting parameter $\alpha_F$ corresponding to the signal in the left direction, the signal in the right direction, and the signal in the center direction; a second processing subunit 4312 configured to generate, according to $$\alpha_B = \begin{cases} \alpha_{B,min1}, \theta = 0 \\ \alpha_{B,min1} + \frac{\alpha_{B,med1} - \alpha_{B,min1}}{90}\theta, \theta \in (0, 90) \\ \alpha_{B,med1}, \theta = 90 \\ \alpha_{B,med1} + \frac{\alpha_{B,max} - \alpha_{B,med1}}{90}(\theta - 90), \theta \in (90, 180) \\ \alpha_{B,max}, \theta = 180 \\ \alpha_{B,max} + \frac{\alpha_{B,med2} - \alpha_{B,max}}{90}(\theta - 180), \theta \in (180, 270) \\ \alpha_{B,med2}, \theta = 270 \\ \alpha_{B,med2} + \frac{\alpha_{B,min2} - \alpha_{B,med2}}{90}(\theta - 270), \theta \in (270, 360) \end{cases},$$

the first-type gain adjusting parameter $\alpha_B$ corresponding to the left rear surround signal and the right rear surround signal, where $\alpha_{F,\ min}$, $\alpha_{F,\ med1}$, $\alpha_{F,\ max1}$, $\alpha_{F,\ med2}$, $\alpha_{F,\ max2}$, $\alpha_{B,\ min1}$, $\alpha_{B,\ med1}$, $\alpha_{B,\ min2}$, $\alpha_{B,\ med2}$, and $\alpha_{B,\ max}$ are constants greater than zero, and $\alpha_{F,\ min} < \alpha_{F,\ med1} < \alpha_{F,\ max1}$, $\alpha_{F,\ min} < \alpha_{F,\ med2} < \alpha_{F,\ max2}$, $\alpha_{B,\ min1} < \alpha_{B,\ med1} < \alpha_{B,\ max}$, $\alpha_{B,\ min2} < \alpha_{B,\ med2} < \alpha_{B,\ max}$, $\alpha_{B,\ med1} = \alpha_{F,\ med1}$, and $\alpha_{B,\ med2}, \alpha_{F,\ med2}$; a third processing subunit 4313 configured to generate, according to $$\alpha_L = \begin{cases} \alpha_{L,med1}, \theta = 0 \\ \alpha_{L,med1} + \frac{\alpha_{L,max} - \alpha_{L,med1}}{90}\theta, \theta \in (0, 90) \\ \alpha_{L,max}, \theta = 90 \\ \alpha_{L,max} + \frac{\alpha_{L,med2} - \alpha_{L,max}}{90}(\theta - 90), \theta \in (90, 180) \\ \alpha_{L,med2}, \theta = 180 \\ \alpha_{L,med2} + \frac{\alpha_{L,min} - \alpha_{L,med2}}{90}(\theta - 180), \theta \in (180, 270) \\ \alpha_{L,min}, \theta = 270 \\ \alpha_{L,min} + \frac{\alpha_{L,med1} - \alpha_{L,min}}{90}(\theta - 270), \theta \in (270, 360) \end{cases},$$

the second-type gain adjusting parameter $\alpha_L$ corresponding to the signal in the left direction and the left rear surround signal; and a fourth processing subunit 4314 configured to generate, according to $$\alpha_R = \begin{cases} \alpha_{R,med1}, & \theta = 0 \\ \alpha_{R,med1} + \dfrac{\alpha_{R,min} - \alpha_{R,med1}}{90}\theta, & \theta \in (0, 90) \\ \alpha_{R,min}, & \theta = 90 \\ \alpha_{R,min} + \dfrac{\alpha_{R,med2} - \alpha_{R,min}}{90}(\theta - 90), & \theta \in (90, 180) \\ \alpha_{R,med2}, & \theta = 180 \\ \alpha_{R,med2} + \dfrac{\alpha_{R,max} - \alpha_{R,med2}}{90}(\theta - 180), & \theta \in (180, 270) \\ \alpha_{R,max}, & \theta = 270 \\ \alpha_{R,max} + \dfrac{\alpha_{R,med1} - \alpha_{R,max}}{90}(\theta - 270), & \theta \in (270, 360) \end{cases},$$

the second-type gain adjusting parameter $\alpha_R$ corresponding to the signal in the right direction and the right rear surround signal, where $\alpha_{L, med1}$, $\alpha_{L, max}$, $\alpha_{L, med2}$, $\alpha_{L, min}$, $\alpha_{R, med1}$, $\alpha_{R, min}$, $\alpha_{R, med2}$, and $\alpha_{R, max}$ are constants greater than zero $\alpha_{L, min} < \alpha_{L, med1} < \alpha_{L, max}$, $\alpha_{L, min} < \alpha_{L, med2} < \alpha_{L, max}$, $\alpha_{R, min} < \alpha_{R, med1} < \alpha_{R, max}$, $\alpha_{R, min} < \alpha_{R, med2} < \alpha_{R, max}$, $\alpha_{L, med1} = \alpha_{R, med1}$, and $\alpha_{L, med2} = \alpha_{R, med2}$.

Figure 4H:
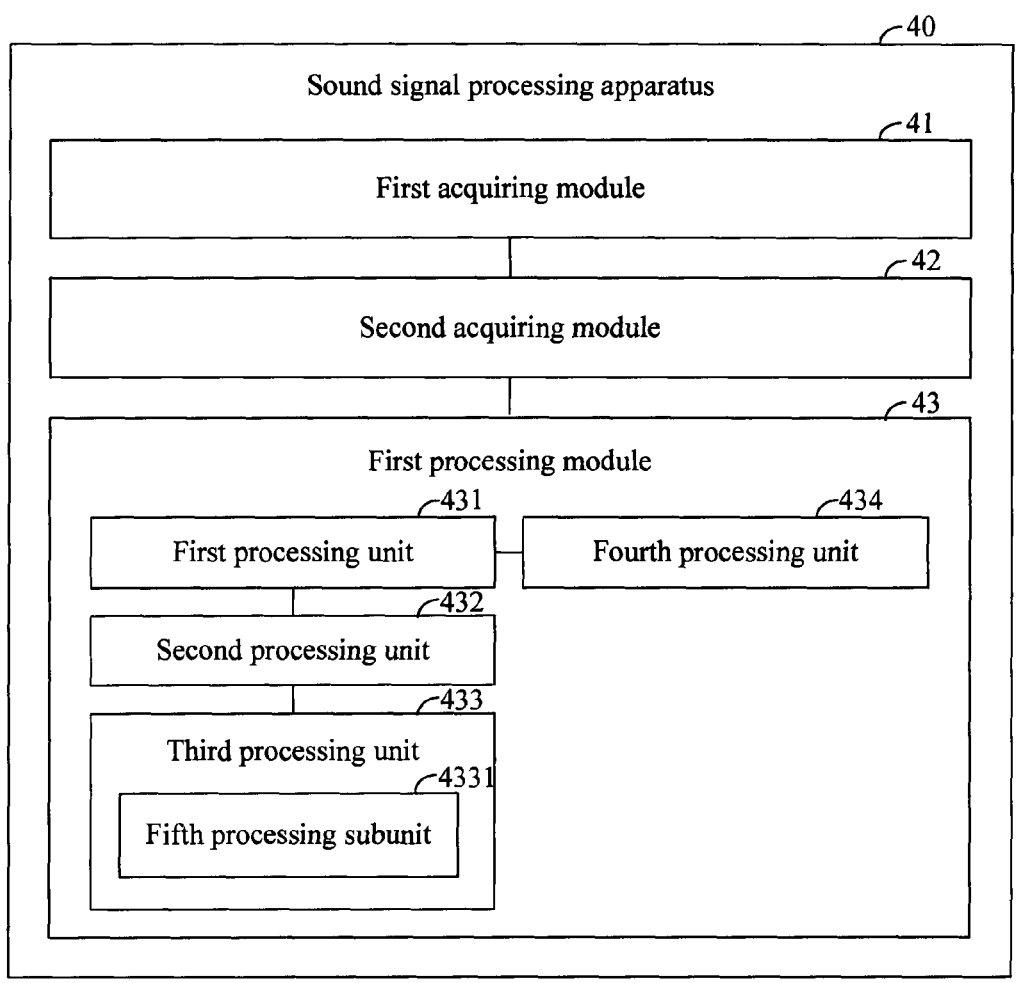

The signals in all the directions in the spatial audio signals are generated according to the third processing unit 433, and as shown in FIG. 4H, the third processing unit 433 includes a fifth processing subunit 4331 configured to acquire the signal $S_{L, final}(n)$ in the left direction, the signal $S_{Cc, final}(n)$ in the center direction, the signal $S_{R, final}(n)$ in the right direction, the left rear surround direction signal $S_{LS, final}(n)$, and the right rear surround signal $S_{RS, final}(n)$ according to $$\begin{cases} S_{L,final}(n) = S_L(n) * \alpha_F * \alpha_L \\ S_{C,final}(n) = S_C(n) * \alpha_F \\ S_{R,final}(n) = S_R(n) * \alpha_F * \alpha_R \\ S_{LS,final}(n) = S_{LS}(n) * \alpha_B * \alpha_L \\ S_{RS,final}(n) = S_{RS}(n) * \alpha_B * \alpha_R \end{cases},$$

where $S_L(n)$ represents an initial value of the signal in the left direction, $S_C(n)$ represents an initial value of the signal in the center direction, $S_R(n)$ represents an initial value of the signal in the right direction, $S_{LS}(n)$ represents an initial value of the left rear surround signal, $S_{RS}(n)$ represents an initial value of the right rear surround signal, and n represents a sampling point number.

Figure 4I:
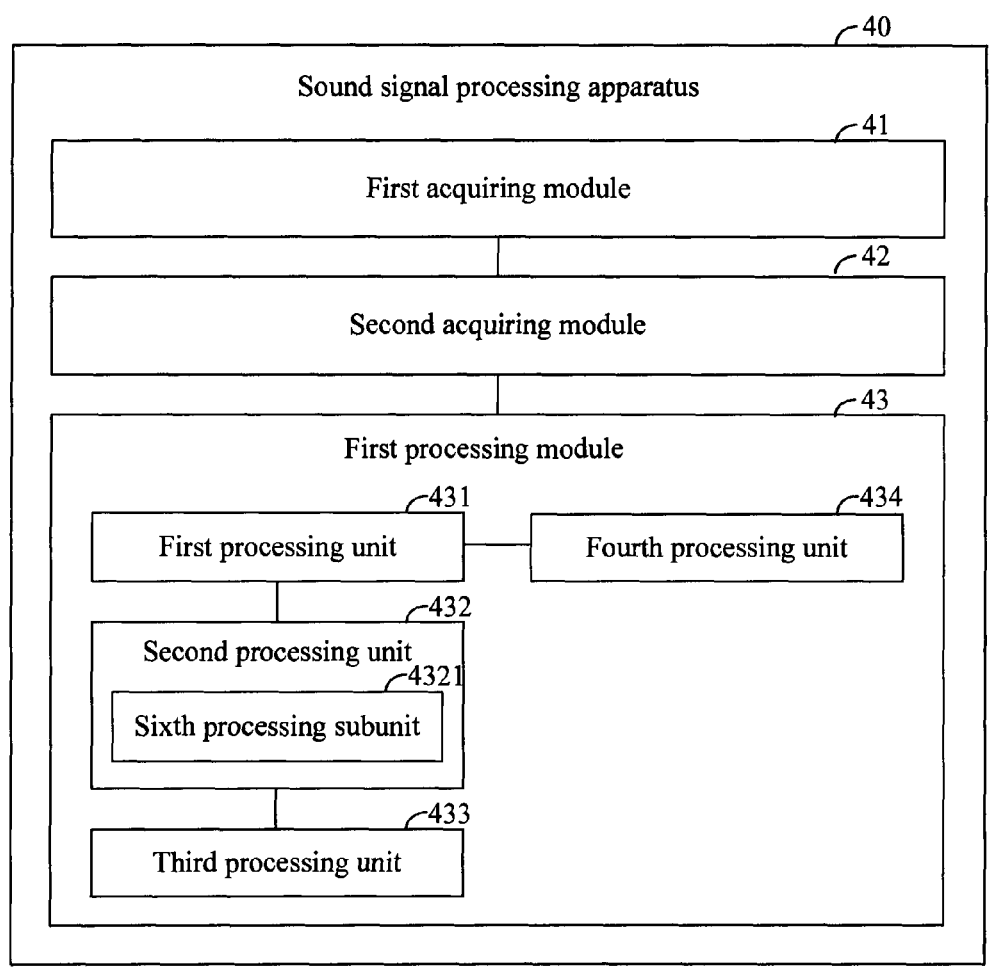

As shown in FIG. 4I, the second processing unit 432 includes a sixth processing subunit 4321 configured to acquire beams $BF_L(n)$, $BF_R(n)$, $BF_L(n)$, and $BF_{RS}(n)$ with heart-shaped directivity, where a maximum directivity of $BF_L(n)$ is within $(0,90°)$ a maximum directivity of $BF_{LS}(k)$ is within $(90°,180°)$, a maximum directivity of $BF_{RS}(k)$ is within $(180°,270°)$, and a maximum directivity of $BF_R(k)$ is within $(270°,360°)$, where an initial value of the signal in the left direction $S_L(n)=BF_L(n)$, an initial value of the signal in the center direction $$S_C(n) = \frac{BF_L(n) + BF_R(n)}{2},$$

an initial value of the signal in the right direction $S_R(n)=BF_R(k)$, an initial value of the left rear surround signal $S_{LS}(n)=BF_{LS}(n)$, and an initial value of the right rear surround signal $S_{RS}(n)=BF_{RS}(n)$, where $S_L(n)$ represents the initial value of the signal in the left direction, $S_C(n)$ represents the initial value of the signal in the center direction, $S_R(n)$ represents the initial value of the signal in the right direction, $S_{LS}(n)$ represents the initial value of the left rear surround signal, $S_{RS}(n)$ represents the initial value of the right rear surround signal, and n represents a sampling point number.

The sixth processing subunit 4321 is configured to acquire a beam $BF_{ij}(n)$ with heart-shaped directivity by using the sound signals received by the $1^{st}$ to the $4^{th}$ microphones, where a point of a maximum directivity of $BF_{ij}(n)$ is in a direction pointing from a connecting line between the $i^{th}$ microphone and a $j^{th}$ microphone to the $i^{th}$ microphone, and a zero point of directivity of $BF_{ij}(n)$ is in a direction pointing from the connecting line between the $i^{th}$ microphone and the $j^{th}$ microphone to the $j^{th}$ microphone, where i and j are equal to 1, 2, 3, or 4; and acquire the beams $BF_L(n)$, $BF_R(n)$, $BF_{LS}(n)$, and $BF_{RS}(n)$ with heart-shaped directivity according to $$\begin{cases} BF_L(n) = \dfrac{BF_{21}(n) + BF_{23}(n)}{2} \\ BF_R(n) = \dfrac{BF_{12}(n) + BF_{14}(n)}{2} \\ BF_{LS}(n) = \dfrac{BF_{32}(n) + BF_{34}(n)}{2} \\ BF_{RS}(n) = \dfrac{BF_{41}(n) + BF_{43}(n)}{2} \end{cases}.$$

Figure 4J:
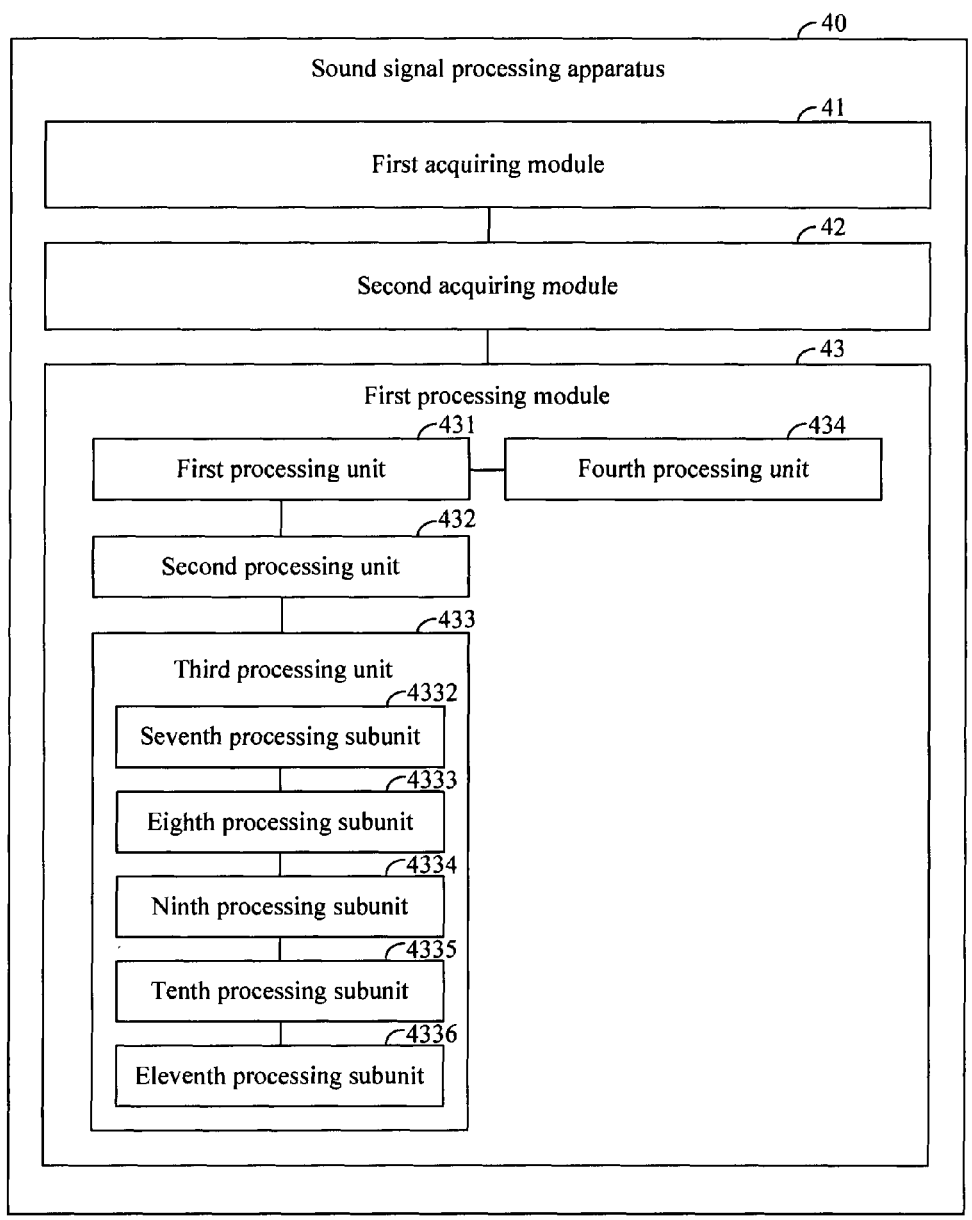

As shown in FIG. 4J, the third processing unit 433 further includes a seventh processing subunit 4332 configured to acquire the signal $S_{L, final}(n)$ in the left direction according to $S_{L, final}(n)=S_L(n)*\alpha_L$; an eighth processing subunit 4333 configured to acquire the signal $S_{C, final}(n)$ in the center direction according to $S_{C, final}(n)=S_C(n)$; a ninth processing subunit 4334 configured to acquire the signal $S_{R, final}(n)$ in the right direction according to $S_{R, final}(n)=S_R(n)*\alpha_R$; a tenth processing subunit 4335 configured to acquire the left rear surround signal $S_{LS, final}(n)$ according to $S_{LS, final}(n)=S_{LS}(n)*\alpha_L$; and an eleventh processing subunit 4336 configured to acquire the right rear surround signal $S_{RS, final}(n)$ according to $S_{RS, final}(n)=S_{RS}(n)*\alpha_R$, where $S_L(n)$ represents an initial value of the signal in the left direction, $S_C(n)$ represents an initial value of the signal in the center direction, $S_R(n)$ represents an initial value of the signal in the right direction, $S_{LS}(n)$ represents an initial value of the left rear surround signal, $S_{RS}(n)$ represents an initial value of the right rear surround signal, and n represents a sampling point number.

According to the sound signal processing apparatus provided in this embodiment of the present invention, sound signals can be acquired from a three-dimensional sound field of a mobile terminal; directions of all sound sources relative to the mobile terminal are acquired; and then, spatial audio signals used for simulating the three-dimensional sound field are generated by using the directions of the sound sources relative to the mobile terminal and the sound signals. In a solution provided in the present invention, sound signals used for simulating a three-dimensional sound field can be collected and processed by using elements of a mobile terminal; in addition, directions, relative to the mobile terminal, of sound sources received in all directions are obtained by means of analysis; and then, an effect of the three-dimensional sound field is enhanced according to the directions, relative to the mobile terminal, of the sound sources in all the directions. In a solution in the prior art, a three-dimensional sound field is simulated by using only beams. However, in the present invention, directions, relative to the mobile terminal, of the sound sources in all the directions are acquired, and further, gain adjustment is performed on beamforming by using information about the directions; therefore, a phenomenon in which a difference between left and right directions is more obvious than a difference between front and rear directions in the simulated three-dimensional sound field can be relieved, thereby improving quality of the simulated three-dimensional sound field.

Figure 5:
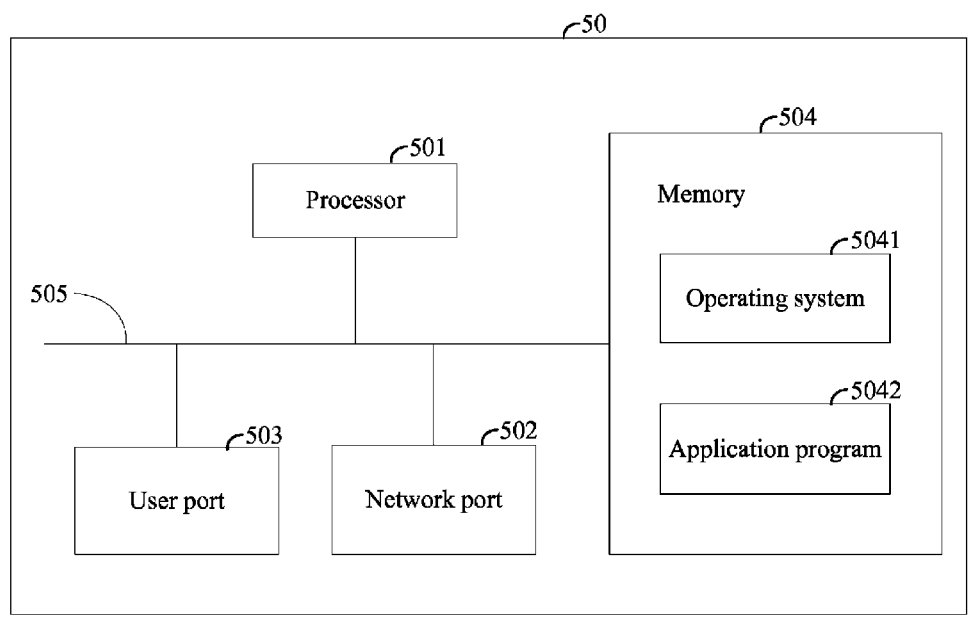
FIG. 5 is a schematic structural diagram of a sound signal processing entity according to an embodiment of the present invention.

An embodiment of the present invention further provides a structure of a sound signal processing device 50. As shown in FIG. 5, the sound signal processing device 50 includes at least one processor 501, such as a central processing unit (CPU), at least one network port 502 or another user port 503, a memory 504, and at least one communications bus 505. The communications bus 505 is configured to implement connection and communication between the components. Optionally, the user port 503 is further included, including a display, a keyboard or a click device (such as a mouse, a trackball, or a touch panel or a touch display screen). The memory 504 may include a high-speed random-access memory (RAM) memory, or may further include a non-volatile memory, for example, at least one disk memory. The memory 504 may optionally include at least one storage apparatus located far away from the foregoing processor 501.

In some implementation manners, the memory 504 stores the following elements, an executable module or a data structure, or a subset thereof, or an extension set thereof: an operating system 5041, including various system programs and configured to implement various basic services and process a hardware-based task; and an application program 5042, including various application programs and configured to implement various application services.

The processor 501 is configured to acquire sound signals from a three-dimensional sound field, where at least three microphones are disposed on the mobile terminal and one microphone is configured to receive a sound signal in at least one direction; acquire, according to the acquired sound signals, a direction of a sound source relative to the mobile terminal; and obtain spatial audio signals according to the direction of the sound source relative to the mobile terminal and the acquired sound signals, where the spatial audio signals are used for simulating the three-dimensional sound field.

The processor 501 is further configured to acquire a time difference of arrival between a sound signal in one direction and a sound signal in another direction that are received by the microphones on the mobile terminal, where the microphones on the mobile terminal are configured to receive sound signals in at least four directions; and obtain, according to the acquired time difference of arrival and locations of the microphones on the mobile terminal on the mobile terminal, the direction of the sound source relative to the mobile terminal.

The processor 501 is configured to acquire, according to $$\hat{\tau}_m = \arg\max_p r_{y_1 y_m}(p),$$

a time difference $\hat{\tau}_m$ of arrival between a sound signal received by an $m^{th}$ microphone and a sound signal received by a $1^{st}$ microphone, where p represents a quantity of delay sampling points, $y_1(n)$ represents the sound signal received by the $1^{st}$ microphone, $y_m(n)$ represents the sound signal received by the $m^{th}$ microphone, $r_{y_1 y_m}(p) = \int_{-\infty}^{\infty} \Phi(f) S_{y_1 y_m}(f) e^{j2\pi f p} df$, $S_{y_1 y_m}(f)$ represents a correlated spectrum between $y_1(n)$ and $y_m(n)$, and $\Phi(f)$ represents a weight function of a frequency domain in which sound signals received in all directions are located.

The obtaining, according to the acquired time difference of arrival and locations of the microphones on the mobile terminal on the mobile terminal, the direction of the sound source relative to the mobile terminal includes estimating, according to $$\hat{\theta}_2 = \arcsin\left(\frac{\hat{\tau}_2 c}{h}\right),$$

a direction $\hat{\theta}_2$ of a sound signal received by a $2^{nd}$ microphone; estimating, according to $$\hat{\theta}_3 = \arccos\left(\frac{\hat{\tau}_3 c}{\sqrt{d^2 + h^2}}\right) - \alpha,$$

a direction $\hat{\theta}_3$ of a sound signal received by a $3^{rd}$ microphone; and estimating, according to $$\hat{\theta}_4 = \arccos\left(\frac{\hat{\tau}_4 c}{d}\right),$$

a direction $\hat{\theta}_4$ of a sound signal received by a $4^{th}$ microphone; and acquiring, according to $$\theta = \frac{1}{3}\sum_{m=2}^{4} \hat{\theta}_m,$$

the direction θ of the sound source relative to the mobile terminal, where the $1^{st}$ microphone and the $4^{th}$ microphone are located on a same side and the $1^{st}$ microphone and the $2^{nd}$ microphone are located on a same side; and c represents a sound speed, d represents a distance between a central point of the $1^{st}$ microphone and a central point of the $4^{th}$ microphone, d is equal to a distance between a central point of the $2^{nd}$ microphone and a central point of the $3^{rd}$ microphone, h represents a distance between the central point of the $1^{st}$ microphone and the central point of the $2^{nd}$ microphone, h is equal to a distance between the central point of the $3^{rd}$ microphone and the central point of the $4^{th}$ microphone, and α represents an included angle between a diagonal of the mobile terminal and a side of an angle at which the $1^{st}$ microphone and the $4^{th}$ microphone are located.

The processor 501 is configured to:
acquire, according to $$\begin{cases} \hat{\tau}_2 = \frac{(y_2 \cos\theta - x_2 \sin\theta) - (y_1 \cos\theta - x_1 \sin\theta)}{c} \\ \hat{\tau}_3 = \frac{(y_3 \cos\theta - x_3 \sin\theta) - (y_1 \cos\theta - x_1 \sin\theta)}{c} \\ \hat{\tau}_4 = \frac{(y_4 \cos\theta - x_4 \sin\theta) - (y_1 \cos\theta - x_1 \sin\theta)}{c} \end{cases},$$

the direction θ of the sound source relative to the mobile terminal, where the $1^{st}$ microphone and the $2^{nd}$ microphone are located on an axis of symmetry of one surface of the mobile terminal and are separately located on two parallel edges on the one surface; the $3^{rd}$ microphone and the $4^{th}$ microphone are located on an axis of symmetry of another surface of the mobile terminal and are separately located on two parallel edges on the another surface; and c represents a sound speed, $(x_1,y_1)$ represents coordinates corresponding to the $1^{st}$ microphone, $(x_2,y_2)$ represents coordinates corresponding to the $2^{nd}$ microphone, $(x_3,y_3)$ represents coordinates corresponding to the $3^{rd}$ microphone, and $(x_4,y_4)$ represents coordinates corresponding to the $4^{th}$ microphone.

The spatial audio signals include at least a signal in a left direction, a signal in a right direction, a signal in a center direction, a left rear surround signal, and a right rear surround signal.

The processor 501 is configured to obtain the spatial audio signals according to the direction of the sound source relative to the mobile terminal and the acquired sound signals, including generating gain adjusting parameters by using the direction of the sound source relative to the mobile terminal, where the gain adjusting parameters include a first-type gain adjusting parameter $\alpha_F$ corresponding to the signal in the left direction, the signal in the right direction, and the signal in the center direction, a first-type gain adjusting parameter $\alpha_B$ corresponding to the left rear surround signal and the right rear surround signal, a second-type gain adjusting parameter $\alpha_L$ corresponding to the signal in the left direction and the left rear surround signal, and a second-type gain adjusting parameter $\alpha_R$ corresponding to the signal in the right direction and the right rear surround signal; and in addition, for the direction of the sound source relative to the mobile terminal, when $\theta \in [0,90) \forall (270,360]$, $\alpha_F > \alpha_B$, when $\theta \in (90,270)$, $\alpha_F < \alpha_B$, when $\theta \in (0,180)$, $\alpha_L > \alpha_R$, and when $\theta \in (180,360)$, $\alpha_L < \alpha_R$; acquiring initial values of the signals in all the directions in the spatial audio signals according to the sound signals; and generating the signal in the left direction, the signal in the right direction, the signal in the center direction, the left rear surround signal, and the right rear surround signal according to the gain adjusting parameters and the initial values of the signals in all the directions in the spatial audio signals.

In the device 50, the spatial audio signals further include a two-channel signal; and the processor 501 is further configured to downmixing the signal in the left direction, the signal in the right direction, the signal in the center direction, the left rear surround signal, and the right rear surround signal to generate the two-channel signal.

Optionally, on a basis of the foregoing implementation manner, the processor 501 may further be configured to generate, according to $$\alpha_F = \begin{cases} \alpha_{F,max1}, \theta = 0 \\ \alpha_{F,max1} + \frac{\alpha_{F,med1} - \alpha_{F,max1}}{90}\theta, \theta \in (0, 90) \\ \alpha_{F,med1}, \theta = 90 \\ \alpha_{F,med1} + \frac{\alpha_{F,min} - \alpha_{F,med1}}{90}(\theta - 90), \theta \in (90, 180) \\ \alpha_{F,min}, \theta = 180 \\ \alpha_{F,min} + \frac{\alpha_{F,med2} - \alpha_{F,min}}{90}(\theta - 180), \theta \in (180, 270) \\ \alpha_{F,med2}, \theta = 270 \\ \alpha_{F,med2} + \frac{\alpha_{F,max2} - \alpha_{F,med2}}{90}(\theta - 270), \theta \in (270, 360) \end{cases},$$

the first-type gain adjusting parameter $\alpha_F$ corresponding to the signal in the left direction, the signal in the right direction, and the signal in the center direction; generate, according to $$\alpha_B = \begin{cases} \alpha_{B,min1}, \theta = 0 \\ \alpha_{B,min1} + \frac{\alpha_{B,med1} - \alpha_{B,min1}}{90}\theta, \theta \in (0, 90) \\ \alpha_{B,med1}, \theta = 90 \\ \alpha_{B,med1} + \frac{\alpha_{B,max} - \alpha_{B,med1}}{90}(\theta - 90), \theta \in (90, 180) \\ \alpha_{B,max}, \theta = 180 \\ \alpha_{B,max} + \frac{\alpha_{B,med2} - \alpha_{B,max}}{90}(\theta - 180), \theta \in (180, 270) \\ \alpha_{B,med2}, \theta = 270 \\ \alpha_{B,med2} + \frac{\alpha_{B,min2} - \alpha_{B,med2}}{90}(\theta - 270), \theta \in (270, 360) \end{cases},$$

the first-type gain adjusting parameter $\alpha_B$ corresponding to the left rear surround signal and the right rear surround signal, where $\alpha_{F, min}$, $\alpha_{F, med1}$, $\alpha_{F, max1}$, $\alpha_{F, med2}$, $\alpha_{F, max2}$, $\alpha_{B, min1}$, $\alpha_{B, med1}$, $\alpha_{B, min2}$, $\alpha_{B, med2}$, and $\alpha_{B, max}$ are constants greater than zero, and $\alpha_{F, min} < \alpha_{F, med1} < \alpha_{F, max1}$, $\alpha_{F, min} < \alpha_{F, med2} < \alpha_{F, max2}$, $\alpha_{B, min1} < \alpha_{B, med1} < \alpha_{B, max}$, $\alpha_{B, min2} < \alpha_{B, med2} < \alpha_{B, max}$, $\alpha_{B, med1} = \alpha_{F, med1}$, and $\alpha_{B, med2} = \alpha_{F, med2}$; generate, according to $$\alpha_L = \begin{cases} \alpha_{L,med1}, \theta = 0 \\ \alpha_{L,med1} + \frac{\alpha_{L,max} - \alpha_{L,med1}}{90}\theta, \theta \in (0, 90) \\ \alpha_{L,max}, \theta = 90 \\ \alpha_{L,max} + \frac{\alpha_{L,med2} - \alpha_{L,max}}{90}(\theta - 90), \theta \in (90, 180) \\ \alpha_{L,med2}, \theta = 180 \\ \alpha_{L,med2} + \frac{\alpha_{L,min} - \alpha_{L,med2}}{90}(\theta - 180), \theta \in (180, 270) \\ \alpha_{L,min}, \theta = 270 \\ \alpha_{L,min} + \frac{\alpha_{L,med1} - \alpha_{L,min}}{90}(\theta - 270), \theta \in (270, 360) \end{cases},$$

the second-type gain adjusting parameter $\alpha_L$ corresponding to the signal in the left direction and the left rear surround signal; and generate, according to $$\alpha_R = \begin{cases} \alpha_{R,med1}, \theta = 0 \\ \alpha_{R,med1} + \frac{\alpha_{R,min} - \alpha_{R,med1}}{90}\theta, \theta \in (0, 90) \\ \alpha_{R,min}, \theta = 90 \\ \alpha_{R,min} + \frac{\alpha_{R,med2} - \alpha_{R,min}}{90}(\theta - 90), \theta \in (90, 180) \\ \alpha_{R,med2}, \theta = 180 \\ \alpha_{R,med2} + \frac{\alpha_{R,max} - \alpha_{R,med2}}{90}(\theta - 180), \theta \in (180, 270) \\ \alpha_{R,max}, \theta = 270 \\ \alpha_{R,max} + \frac{\alpha_{R,med1} - \alpha_{R,max}}{90}(\theta - 270), \theta \in (270, 360) \end{cases},$$

the second-type gain adjusting parameter $\alpha_R$ corresponding to the signal in the right direction and the right rear surround signal, where $\alpha_{L, med1}$, $\alpha_{L, max}$, $\alpha_{L, med2}$, $\alpha_{L, min}$, $\alpha_{R, med1}$, $\alpha_{R, min}$, $\alpha_{R, med2}$, and $\alpha_{R, max}$ are constants greater than zero, $\alpha_{L, min} < \alpha_{L, med1} < \alpha_{L, max}$, $\alpha_{L, min} < \alpha_{L, med2} < \alpha_{L, max}$, $\alpha_{R, min} < \alpha_{R, med1} < \alpha_{R, max}$, $\alpha_{R, min} < \alpha_{R, med2} < \alpha_{R, max}$, $\alpha_{L, med1} = \alpha_{R, med1}$, and $\alpha_{L, med2} = \alpha_{R, med2}$.

The processor 501 is further configured to acquire the signal $S_{L, final}(n)$ in the left direction, the signal $S_{C, final}(n)$ in the center direction, the signal $S_{R, final}(n)$ in the right direction, the left rear surround direction signal $S_{LS, final}(n)$ and the right rear surround signal $S_{RS, final}(n)$ according to $$\begin{cases} S_{L,final}(n) = S_L(n) * \alpha_F * \alpha_L \\ S_{C,final}(n) = S_C(n) * \alpha_F \\ S_{R,final}(n) = S_R(n) * \alpha_F * \alpha_R \\ S_{LS,final}(n) = S_{LS}(n) * \alpha_B * \alpha_L \\ S_{RS,final}(n) = S_{RS}(n) * \alpha_B * \alpha_R \end{cases},$$

where $S_L(n)$ represents an initial value of the signal in the left direction, $S_C(n)$ represents an initial value of the signal in the center direction, $S_R(n)$ represents an initial value of the signal in the right direction, $S_{LS}(n)$ represents an initial value of the left rear surround signal, $S_{RS}(n)$ represents an initial value of the right rear surround signal, and n represents a sampling point number.

The processor 501 is further configured to acquire beams $BF_L(n)$, $BF_R(n)$, $BF_{LS}(n)$, and $BF_{RS}(n)$ with heart-shaped directivity, where a maximum directivity of $BF_L(n)$ is within $(0,90°)$ a maximum directivity of $BF_{LS}(n)$ is within $(90, 180°)$, a maximum directivity of $BF_{RS}(n)$ is within $(180°, 270°)$, and a maximum directivity of $BF_R(n)$ is within $(270°,360°)$, where the initial value of the signal in the left direction $S_L(n)=BF_L(n)$, the initial value of the signal in the center direction $$S_C(n) = \frac{BF_L(n) + BF_R(n)}{2},$$

the initial value of the signal in the right direction $S_R(n)=BF_R(k)$, the initial value of the left rear surround signal $S_{LS}(n)=BF_{LS}(n)$, and the initial value of the right rear surround signal $S_{RS}(n)=BF_{RS}(n)$, where $S_L(n)$ represents the initial value of the signal in the left direction, $S_C(n)$ represents the initial value of the signal in the center direction, $S_R(n)$ represents the initial value of the signal in the right direction, $S_{LS}(n)$ represents the initial value of the left rear surround signal, $S_{RS}(n)$ represents the initial value of the right rear surround signal, and n represents a sampling point number.

Further, the acquiring beams $BF_L(n)$, $BF_R(n)$, $BF_{LS}(n)$, and $BF_{RS}(n)$ with heart-shaped directivity includes acquiring a beam $BF_{ij}(n)$ with heart-shaped directivity by using the sound signals received by the $1^{st}$ to the $4^{th}$ microphones, where a point of a maximum directivity of $BF_{ij}(n)$ is in a direction pointing from a connecting line between the $i^{th}$ microphone and a $j^{th}$ microphone to the $i^{th}$ microphone, and a zero point of directivity of $BF_{ij}(n)$ is in a direction pointing from the connecting line between the $i^{th}$ microphone and the $j^{th}$ microphone to the $j^{th}$ microphone, where i and j are equal to 1, 2, 3, or 4; and acquiring the beams $BF_L(n)$, $BF_R(n)$, $BF_{LS}(n)$, and $BF_{RS}(n)$ with heart-shaped directivity according to $$\begin{cases} BF_L(n) = \frac{BF_{21}(n) + BF_{23}(n)}{2} \\ BF_R(n) = \frac{BF_{12}(n) + BF_{14}(n)}{2} \\ BF_{LS}(n) = \frac{BF_{32}(n) + BF_{34}(n)}{2} \\ BF_{RS}(n) = \frac{BF_{41}(n) + BF_{43}(n)}{2} \end{cases}.$$

The processor 501 is further configured to acquire the signal $S_{L,final}(n)$ in the left direction according to $S_{L,final}(n)=S_L(n)*\alpha_L$; acquire the signal $S_{C,final}(n)$ in the center direction according to $S_{C,final}(n)=S_C(n)$; acquire the signal $S_{R,final}(n)$ in the right direction according to $S_{R,final}(n)=S_R(n)*\alpha_R$; acquire the left rear surround signal $S_{LS,final}(n)$ according to $S_{LS,final}(n)=S_{LS}(n)*\alpha_L$; and acquire the right rear surround signal $S_{RS,final}(n)$ according to $S_{RS,final}(n)=S_{RS}(n)*\alpha_R$, where $S_L(n)$ represents the initial value of the signal in the left direction, $S_C(n)$ represents the initial value of the signal in the center direction, $S_R(n)$ represents the initial value of the signal in the right direction, $S_{LS}(n)$ represents the initial value of the left rear surround signal, $S_{RS}(n)$ represents the initial value of the right rear surround signal, and n represents a sampling point number.

According to the sound signal processing device provided in this embodiment of the present invention, sound signals can be acquired from a three-dimensional sound field of a mobile terminal; directions of all sound sources relative to the mobile terminal are acquired; and then, spatial audio signals used for simulating the three-dimensional sound field are generated by using the directions of the sound sources relative to the mobile terminal and the sound signals. In a solution provided in the present invention, sound signals used for simulating a three-dimensional sound field can be collected and processed by using elements of a mobile terminal; in addition, directions, relative to the mobile terminal, of sound sources received in all directions are obtained by means of analysis; and then, an effect of the three-dimensional sound field is enhanced according to the directions, relative to the mobile terminal, of the sound sources in all the directions. In a solution in the prior art, a three-dimensional sound field is simulated by using only beams. However, in the present invention, directions, relative to the mobile terminal, of the sound sources in all the directions are acquired, and further, gain adjustment is performed on beamforming by using information about the directions; therefore, a phenomenon in which a difference between left and right directions is more obvious than a difference between front and rear directions in the simulated three-dimensional sound field can be relieved, thereby improving quality of the simulated three-dimensional sound field.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), a RAM, or the like.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claim is:
1. A sound signal processing method, comprising:
acquiring, by a mobile terminal, sound signals from a three-dimensional sound field, wherein at least three microphones are disposed on the mobile terminal and one microphone is configured to receive a sound signal in at least one direction;
acquiring, according to the acquired sound signals, a direction of a sound source relative to the mobile terminal; and
obtaining spatial audio signals according to the direction of the sound source relative to the mobile terminal and the acquired sound signals, wherein the spatial audio signals are used for simulating the three-dimensional sound field,
wherein acquiring, according to the acquired sound signals, the direction of the sound source relative to the mobile terminal comprises:
acquiring a time difference of arrival between a sound signal in one direction and a sound signal in another direction that are received by the microphones on the mobile terminal, wherein the microphones on the mobile terminal are configured to receive the sound signals in at least four directions; and
obtaining, according to the acquired time difference of arrival and locations of the microphones on the mobile terminal, the direction of the sound source relative to the mobile terminal,
wherein acquiring the time difference of arrival between the sound signal in one direction and the sound signal in another direction that are received by the microphones on the mobile terminal comprises acquiring, according to

$$\hat{\tau}_m = \underset{p}{\operatorname{argmax}} r_{y_1 y_m}(p),$$

a time difference $\hat{\tau}_m$ of arrival between a sound signal received by an $m^{th}$ microphone and a sound signal received by a $1^{st}$ microphone,
wherein p represents a quantity of delay sampling points, $y_1(n)$ represents the sound signal received by the $1^{st}$ microphone, $y_m(n)$ represents the sound signal received by the $m^{th}$ microphone, $$r_{y_1 y_m}(p) = \int_{-\infty}^{\infty} \Phi(f) S_{y_1 y_m}(f) e^{j2\pi f p} df,$$

$S_{y_1 y_m}(f)$ represents a correlated spectrum between $y_1(n)$ and $y_m(n)$, and $\Phi(f)$ represents a weight function of a frequency domain in which the sound signals received in all directions are located, and
wherein obtaining, according to the acquired time difference of arrival and locations of the microphones on the mobile terminal, the direction of the sound source relative to the mobile terminal comprises:
estimating, according to $$\hat{\theta}_2 = \arcsin\left(\frac{\hat{\tau}_2 c}{h}\right),$$

a direction $\hat{\theta}_2$ of a sound signal received by a $2^{nd}$ microphone;
estimating, according to $$\hat{\theta}_3 = \arccos\left(\frac{\hat{\tau}_3 c}{\sqrt{d^2 + h^2}}\right) - \alpha,$$

a direction $\hat{\theta}_3$ of a sound signal received by a $3^{rd}$ microphone;
estimating, according to $$\hat{\theta}_4 = \arccos\left(\frac{\hat{\tau}_4 c}{d}\right),$$

a direction $\hat{\theta}_4$ of a sound signal received by a $4^{th}$ microphone; and
acquiring, according to $$\theta = \frac{1}{3} \sum_{m=2}^{4} \hat{\theta}_m,$$

the direction $\theta$ of the sound source relative to the mobile terminal,
wherein the $1^{st}$ microphone and the $4^{th}$ microphone are located on a same side and the $1^{st}$ microphone and the $2^{nd}$ microphone are located on a same side, and
wherein c represents a sound speed, d represents a distance between a central point of the $1^{st}$ microphone and a central point of the $4^{th}$ microphone, d is equal to a distance between a central point of the $2^{nd}$ microphone and a central point of the $3^{rd}$ microphone, h represents a distance between the central point of the $1^{st}$ microphone and the central point of the $2^{nd}$ microphone, h is equal to a distance between the central point of the $3^{rd}$ microphone and the central point of the $4^{th}$ microphone, and α represents an included angle between a diagonal of the mobile terminal and a side of an angle at which the $1^{st}$ microphone and the $4^{th}$ microphone are located.
2. A sound signal processing method, comprising:
acquiring, by a mobile terminal, sound signals from a three-dimensional sound field, wherein at least three microphones are disposed on the mobile terminal and one microphone is configured to receive a sound signal in at least one direction;
acquiring, according to the acquired sound signals, a direction of a sound source relative to the mobile terminal; and
obtaining spatial audio signals according to the direction of the sound source relative to the mobile terminal and the acquired sound signals, wherein the spatial audio signals are used for simulating the three-dimensional sound field,
wherein acquiring, according to the acquired sound signals, the direction of the sound source relative to the mobile terminal comprises:
acquiring a time difference of arrival between a sound signal in one direction and a sound signal in another direction that are received by the microphones on the mobile terminal, wherein the microphones on the mobile terminal are configured to receive the sound signals in at least four directions; and obtaining, according to the acquired time difference of arrival and locations of the microphones on the mobile terminal, the direction of the sound source relative to the mobile terminal, wherein acquiring the time difference of arrival between the sound signal in one direction and the sound signal in another direction that are received by the microphones on the mobile terminal comprises acquiring, according to $$\hat{\tau}_m = \mathrm{argmax}_p r_{y_1 y_m}(p),$$

a time difference $\hat{\tau}_m$ of arrival between a sound signal received by an $m^{th}$ microphone and a sound signal received by a $1^{st}$ microphone, wherein p represents a quantity of delay sampling points, $y_1(n)$ represents the sound signal received by the $1^{st}$ microphone, $y_m(n)$ represents the sound signal received by the $m^{th}$ microphone, $$r_{y_1 y_m}(p) = \int_{-\infty}^{\infty} \Phi(f) S_{y_1 y_m}(f) e^{j 2\pi f p}\, df,$$

$S_{y_1 y_m}(f)$ represents a correlated spectrum between $y_1(n)$ and $y_m(n)$, and $\Phi(f)$ represents a weight function of a frequency domain in which the sound signals received in all directions are located, and wherein obtaining, according to the acquired time difference of arrival and locations of the microphones on the mobile terminal, the direction of the sound source relative to the mobile terminal comprises:

acquiring, according to $$\begin{cases} \hat{\tau}_2 = \dfrac{(y_2\cos\theta - x_2\sin\theta) - (y_1\cos\theta - x_1\sin\theta)}{c} \\ \hat{\tau}_3 = \dfrac{(y_3\cos\theta - x_3\sin\theta) - (y_1\cos\theta - x_1\sin\theta)}{c} \\ \hat{\tau}_4 = \dfrac{(y_4\cos\theta - x_4\sin\theta) - (y_1\cos\theta - x_1\sin\theta)}{c} \end{cases},$$

the direction θ of the sound source relative to the mobile terminal, wherein the $1^{st}$ microphone and the $2^{nd}$ microphone are located on an axis of symmetry of one surface of the mobile terminal and are separately located on two parallel edges on the one surface, wherein the $3^{rd}$ microphone and the $4^{th}$ microphone are located on an axis of symmetry of another surface of the mobile terminal and are separately located on two parallel edges on the another surface, and wherein c represents a sound speed, $(x_1,y_1)$ represents coordinates corresponding to the $1^{st}$ microphone, $(x_2,y_2)$ represents coordinates corresponding to the $2^{nd}$ microphone, $(x_3,y_3)$ represents coordinates corresponding to the $3^{rd}$ microphone, and $(x_4,y_4)$ represents coordinates corresponding to the $4^{th}$ microphone.

3. A sound signal processing method, comprising:

acquiring, by a mobile terminal, sound signals from a three-dimensional sound field, wherein at least three microphones are disposed on the mobile terminal and one microphone is configured to receive a sound signal in at least one direction:

acquiring, according to the acquired sound signals, a direction of a sound source relative to the mobile terminal; and obtaining spatial audio signals according to the direction of the sound source relative to the mobile terminal and the acquired sound signals, wherein the spatial audio signals are used for simulating the three-dimensional sound field, wherein the spatial audio signals comprise at least a signal in a left direction, a signal in a right direction, a signal in a center direction, a left rear surround signal, and a right rear surround signal, and wherein obtaining spatial audio signals according to the direction of the sound source relative to the mobile terminal and the acquired sound signals comprises:

generating gain adjusting parameters by using the direction of the sound source relative to the mobile terminal, wherein the gain adjusting parameters comprise a first-type gain adjusting parameter $\alpha_F$ corresponding to the signal in the left direction, the signal in the right direction, and the signal in the center direction, a first-type gain adjusting parameter $\alpha_B$ corresponding to the left rear surround signal and the right rear surround signal, a second-type gain adjusting parameter $\alpha_L$ corresponding to the signal in the left direction and the left rear surround signal, and a second-type gain adjusting parameter $\alpha_R$ corresponding to the signal in the right direction and the right rear surround signal, and in addition, for the direction of the sound source relative to the mobile terminal, when $\theta \in [0,90) \cup (270,360]$, $\alpha_F > \alpha_B$, when $\theta \in (90,270)$, $\alpha_F < \alpha_B$, when $\theta \in (0,180)$, $\alpha_L > \alpha_R$, and when $\theta \in (180,360)$, $\alpha_L < \alpha_R$;

acquiring initial values of the signals in all the directions in the spatial audio signals according to the sound signals; and generating the signal in the left direction, the signal in the right direction, the signal in the center direction, the left rear surround signal, and the right rear surround signal according to the gain adjusting parameters and the initial values of the signals in all the directions in the spatial audio signals.

4. The sound signal processing method according to claim 3, wherein the spatial audio signals further comprise a two-channel signal, and wherein the method further comprises downmixing the signal in the left direction, the signal in the right direction, the signal in the center direction, the left rear surround signal, and the right rear surround signal to generate the two-channel signal.

5. The sound signal processing method according to claim 3, wherein generating the gain adjusting parameters by using the direction of the sound source relative to the mobile terminal comprises:

generating, according to $$\alpha_F = \begin{cases} \alpha_{F,max1}, \theta = 0 \\ \alpha_{F,max1} + \frac{\alpha_{F,med1} - \alpha_{F,max1}}{90}\theta, \theta \in (0, 90) \\ \alpha_{F,med1}, \theta = 90 \\ \alpha_{F,med1} + \frac{\alpha_{F,min} - \alpha_{F,med1}}{90}(\theta - 90), \theta \in (90, 180) \\ \alpha_{F,min}, \theta = 180 \\ \alpha_{F,min} + \frac{\alpha_{F,med2} - \alpha_{F,min}}{90}(\theta - 180), \theta \in (180, 270) \\ \alpha_{F,med2}, \theta = 270 \\ \alpha_{F,med2} + \frac{\alpha_{F,max2} - \alpha_{F,med2}}{90}(\theta - 270), \theta \in (270, 360) \end{cases},$$

the first-type gain adjusting parameter $\alpha_F$ corresponding to the signal in the left direction, the signal in the right direction, and the signal in the center direction;

generating, according to $$\alpha_B = \begin{cases} \alpha_{B,min1}, \theta = 0 \\ \alpha_{B,min1} + \frac{\alpha_{B,med1} - \alpha_{B,min1}}{90}\theta, \theta \in (0, 90) \\ \alpha_{B,med1}, \theta = 90 \\ \alpha_{B,med1} + \frac{\alpha_{B,max} - \alpha_{B,med1}}{90}(\theta - 90), \theta \in (90, 180) \\ \alpha_{B,max}, \theta = 180 \\ \alpha_{B,max} + \frac{\alpha_{B,med2} - \alpha_{B,max}}{90}(\theta - 180), \theta \in (180, 270) \\ \alpha_{B,med2}, \theta = 270 \\ \alpha_{B,med2} + \frac{\alpha_{B,min2} - \alpha_{B,med2}}{90}(\theta - 270), \theta \in (270, 360) \end{cases},$$

the first-type gain adjusting parameter $\alpha_B$ corresponding to the left rear surround signal and the right rear surround signal, wherein $\alpha_{F, min}$, $\alpha_{F, med1}$, $\alpha_{F, max1}$, $\alpha_{F, med2}$, $\alpha_{F, max2}$, $\alpha_{B, min1}$, $\alpha_{B, med1}$, $\alpha_{B, min2}$, $\alpha_{B, med2}$, and $\alpha_{B, max}$ are constants greater than zero, and $\alpha_{F, min} < \alpha_{F, med1} < \alpha_{F, max1}$, $\alpha_{F, min} < \alpha_{F, med2} < \alpha_{F, max2}$, $\alpha_{B, min1} < \alpha_{B, med1} < \alpha_{B, max}$, $\alpha_{B, min2} < \alpha_{B, med2} < \alpha_{B, max}$, $\alpha_{B, med1} = \alpha_{F, med1}$, and $\alpha_{B, med2} = \alpha_{F, med2}$;

generating, according to $$\alpha_L = \begin{cases} \alpha_{L,med1}, \theta = 0 \\ \alpha_{L,med1} + \frac{\alpha_{L,max} - \alpha_{L,med1}}{90}\theta, \theta \in (0, 90) \\ \alpha_{L,max}, \theta = 90 \\ \alpha_{L,max} + \frac{\alpha_{L,med2} - \alpha_{L,max}}{90}(\theta - 90), \theta \in (90, 180) \\ \alpha_{L,med2}, \theta = 180 \\ \alpha_{L,med2} + \frac{\alpha_{L,min} - \alpha_{L,med2}}{90}(\theta - 180), \theta \in (180, 270) \\ \alpha_{L,min}, \theta = 270 \\ \alpha_{L,min} + \frac{\alpha_{L,med1} - \alpha_{L,min}}{90}(\theta - 270), \theta \in (270, 360) \end{cases},$$

the second-type gain adjusting parameter $\alpha_L$ corresponding to the signal in the left direction and the left rear surround signal; and generating, according to $$\alpha_R = \begin{cases} \alpha_{R,med1}, \theta = 0 \\ \alpha_{R,med1} + \frac{\alpha_{R,min} - \alpha_{R,med1}}{90}\theta, \theta \in (0, 90) \\ \alpha_{R,min}, \theta = 90 \\ \alpha_{R,min} + \frac{\alpha_{R,med2} - \alpha_{R,min}}{90}(\theta - 90), \theta \in (90, 180) \\ \alpha_{R,med2}, \theta = 180 \\ \alpha_{R,med2} + \frac{\alpha_{R,max} - \alpha_{R,med2}}{90}(\theta - 180), \theta \in (180, 270) \\ \alpha_{R,max}, \theta = 270 \\ \alpha_{R,max} + \frac{\alpha_{R,med1} - \alpha_{R,max}}{90}(\theta - 270), \theta \in (270, 360) \end{cases},$$

the second-type gain adjusting parameter $\alpha_R$ corresponding to the signal in the right direction and the right rear surround signal, wherein $\alpha_{L, med1}$, $\alpha_{L, max}$, $\alpha_{L, med2}$, $\alpha_{L, min}$, $\alpha_{R, med1}$, $\alpha_{R, min}$, $\alpha_{R, med2}$, and $\alpha_{R, max}$ are constants greater than zero, $\alpha_{L, min} < \alpha_{L, med1} < \alpha_{L, max}$, $\alpha_{L, min} < \alpha_{L, med2} < \alpha_{L, max}$, $\alpha_{R, min} < \alpha_{R, med1} < \alpha_{R, max}$, $\alpha_{R, min} < \alpha_{R, med2} < \alpha_{R, max}$, $\alpha_{L, med1} = \alpha_{R, med1}$, and $\alpha_{L, med2} = \alpha_{R, med2}$.

6. The sound signal processing method according to claim 5, wherein generating the signals in all the directions in the spatial audio signals according to the gain adjusting parameters and the initial values of the signals in all the directions in the spatial audio signals comprises:

acquiring the signal $S_{L, final}(n)$ in the left direction, the signal $S_{C, final}(n)$ in the center direction, the signal $S_{R, final}(n)$ in the right direction, the left rear surround direction signal $S_{LS, final}(n)$, and the right rear surround signal $S_{RS, final}(n)$ according to $$\begin{cases} S_{L,final}(n) = S_L(n) * \alpha_F * \alpha_L \\ S_{C,final}(n) = S_C(n) * \alpha_F \\ S_{R,final}(n) = S_R(n) * \alpha_F * \alpha_R \\ S_{LS,final}(n) = S_{LS}(n) * \alpha_B * \alpha_L \\ S_{RS,final}(n) = S_{RS}(n) * \alpha_B * \alpha_R \end{cases},$$

wherein $S_L(n)$ represents the initial value of the signal in the left direction, $S_C(n)$ represents an initial value of the signal in the left direction, $S_R(n)$ represents an initial value of the signal in the right direction, $S_{LS}(n)$ represents an initial value of the left rear surround signal, $S_{RS}(n)$ represents an initial value of the right rear surround signal, and n represents a sampling point number.

7. The sound signal processing method according to claim 5, wherein acquiring the initial values of the signals in all the directions in the spatial audio signals according to the sound signals comprises acquiring beams $BF_L(n)$, $BF_R(n)$, $BF_{LS}(n)$, and $BF_{RS}(n)$ with heart-shaped directivity, wherein a maximum directivity of $BF_L(n)$ is within $(0,90°)$ a maximum directivity of $BF_{LS}(n)$ is within $(90°,180°)$, a maximum directivity of $BF_{RS}(n)$ is within $(180°,270°)$, and a maximum directivity of $BF_R(n)$ is within $(270°,360°)$, wherein an initial value of the signal in the left direction $S_L(n)=BF_L(n)$, an initial value of the signal in the center direction $$S_C(n) = \frac{BF_L(n) + BF_R(n)}{2},$$

an initial value of the signal in the right direction $S_R(n)=BF_R(k)$, an initial value of the left rear surround signal $S_{LS}(n)=BF_{LS}(n)$, and an initial value of the right rear surround signal $S_{RS}(n)=BF_{RS}(n)$, wherein $S_L(n)$ represents the initial value of the signal in the left direction, $S_C(n)$ represents the initial value of the signal in the center direction, $S_R(n)$ represents the initial value of the signal in the right direction, $S_{LS}(n)$ represents the initial value of the left rear surround signal, $S_{RS}(n)$ represents the initial value of the right rear surround signal, and n represents the sampling point number.

8. The sound signal processing method according to claim 7, wherein acquiring beams $BF_L(n)$, $BF_R(n)$, $BF_{LS}(n)$, and $BF_{RS}(n)$ with the heart-shaped directivity comprises:

acquiring a beam $BF_{ij}(n)$ with heart-shaped directivity by using the sound signals received by the 1$^{st}$ to the 4$^{th}$ microphones, wherein a point of a maximum directivity of $BF_{ij}(n)$ is in a direction pointing from a connecting line between the i$^{th}$ microphone and a j$^{th}$ microphone to the i$^{th}$ microphone, and a zero point of directivity of $BF_{ij}(n)$ is in a direction pointing from the connecting line between the i$^{th}$ microphone and the j$^{th}$ microphone to the j$^{th}$ microphone, wherein i and j are equal to 1, 2, 3, or 4; and acquiring the beams $BF_L(n)$, $BF_R(n)$, $BF_{LS}(n)$, and $BF_{RS}(n)$ with heart-shaped directivity according to $$\begin{cases} BF_L(n) = \frac{BF_{21}(n) + BF_{23}(n)}{2} \\ BF_R(n) = \frac{BF_{12}(n) + BF_{14}(n)}{2} \\ BF_{LS}(n) = \frac{BF_{32}(n) + BF_{34}(n)}{2} \\ BF_{RS}(n) = \frac{BF_{41}(n) + BF_{43}(n)}{2} \end{cases}.$$

9. The sound signal processing method according to claim 5, wherein generating the signals in all the directions in the spatial audio signals according to the gain adjusting parameters and the initial values of the signals in all the directions in the spatial audio signals comprises:

acquiring the signal $S_{L,\,final}(n)$ in the left direction according to $S_{L,\,final}(n)=S_L(n)*\alpha_L$;

acquiring the signal $S_{C,\,final}(n)$ in the center direction according to $S_{C,\,final}(n)=S_C(n)$;

acquiring the signal $S_{R,\,final}(n)$ in the right direction according to $S_{R,\,final}(n)=S_R(n)*\alpha_R$;

acquiring the left rear surround signal $S_{LS,\,final}(n)$ according to $S_{LS,\,final}(n)=S_{LS}(n)*\alpha_L$; and acquiring the right rear surround signal $S_{RS,\,final}(n)$ according to $S_{RS,\,final}(n)=S_{RS}(n)*\alpha_R$, wherein $S_L(n)$ represents an initial value of the signal in the left direction, $S_C(n)$ represents an initial value of the signal in the center direction, $S_R(n)$ represents an initial value of the signal in the right direction, $S_{LS}(n)$ represents an initial value of the left rear surround signal, $S_{RS}(n)$ represents an initial value of the right rear surround signal, and n represents the sampling point number.

* * * * *

UNITED STATES PATENT AND TRADEMARK OFFICE
CERTIFICATE OF CORRECTION

PATENT NO. : 9,439,019 B2
APPLICATION NO. : 14/822476
DATED : September 6, 2016
INVENTOR(S) : Jingdong Chen et al.

It is certified that error appears in the above-identified patent and that said Letters Patent is hereby corrected as shown below:

In the Claims

Column 44, Line 48, Claim 6 should read:

The sound signal processing method according to claim 5, wherein generating the signals in all the directions in the spatial audio signals according to the gain adjusting parameters and the initial values of the signals in all the directions in the spatial audio signals comprises:
acquiring the signal $S_{L,\,final}(n)$ in the left direction, the signal $S_{C,\,final}(n)$ in the center direction, the signal $S_{R,\,final}(n)$ in the right direction, the left rear surround direction signal $S_{LS,\,final}(n)$, and the right rear surround signal $S_{RS,\,final}(n)$ according to $$\begin{cases} S_{L,\,final}(n) = S_L(n) * \alpha_F * \alpha_L \\ S_{C,\,final}(n) = S_C(n) * \alpha_F \\ S_{R,\,final}(n) = S_R(n) * \alpha_F * \alpha_R \\ S_{LS,\,final}(n) = S_{LS}(n) * \alpha_B * \alpha_L \\ S_{RS,\,final}(n) = S_{RS}(n) * \alpha_B * \alpha_R \end{cases},$$

wherein $S_L(n)$ represents an initial value of the signal in the left direction, $S_C(n)$ represents an initial value of the signal in the center direction, $S_R(n)$ represents an initial value of the signal in the right direction, $S_{LS}(n)$ represents an initial value of the left rear surround signal $S_{RS}(n)$ represents an initial value of the right rear surround signal, and n represents a sampling point number.

Column 45, Line 31, Column 46, Line 2, Claim 8 should read:

The sound signal processing method according to claim 7, wherein acquiring beams $BF_L(n)$, $BF_R(n)$, $BF_{LS}(n)$, and $BF_{RS}(n)$ with the heart-shaped directivity comprises:
acquiring a beam $BF_{ij}(n)$ with the heart-shaped directivity by using the sound signals received by the $1^{st}$ to the $4^{th}$ microphones, wherein a point of a maximum directivity $BF_{ij}(n)$ is in a direction pointing from a connecting line between a $i^{th}$ microphone and a $j^{th}$ microphone to the $i^{th}$ microphone, and a zero point of directivity of $BF_{ij}(n)$ is in a direction pointing from the connecting line between the $i^{th}$ Signed and Sealed this
Eighth Day of November, 2016

Michelle K. Lee
*Director of the United States Patent and Trademark Office*

CERTIFICATE OF CORRECTION (continued)
U.S. Pat. No. 9,439,019 B2 microphone and the $j^{th}$ microphone to the $j^{th}$ microphone, wherein i and j are equal to 1, 2, 3, or 4; and acquiring the beams $BF_L(n)$, $BF_R(n)$, $BF_{LS}(n)$, and $BF_{RS}(n)$ with the heart-shaped directivity according to $$\begin{cases} BF_L(n) = \dfrac{BF_{21}(n) + BF_{23}(n)}{2} \\ BF_R(n) = \dfrac{BF_{12}(n) + BF_{14}(n)}{2} \\ BF_{LS}(n) = \dfrac{BF_{32}(n) + BF_{34}(n)}{2} \\ BF_{RS}(n) = \dfrac{BF_{41}(n) + BF_{43}(n)}{2} \end{cases}.$$